(12) United States Patent
Matyjaszewski et al.

(10) Patent No.: US 7,332,550 B2
(45) Date of Patent: Feb. 19, 2008

(54) STABILIZATION OF TRANSITION METAL COMPLEXES FOR CATALYSIS IN DIVERSE ENVIRONMENTS

(75) Inventors: Krzysztof Matyjaszewski, Pittsburgh, PA (US); Nicolay Tsarevsky, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 0 days.

(21) Appl. No.: 10/684,137

(22) Filed: Oct. 10, 2003

(65) Prior Publication Data

US 2004/0122189 A1  Jun. 24, 2004

Related U.S. Application Data

(60) Continuation-in-part of application No. 10/625,890, filed on Jul. 23, 2003, now abandoned, which is a division of application No. 09/972,260, filed on Oct. 5, 2001, now Pat. No. 6,624,262.

(60) Provisional application No. 60/417,591, filed on Oct. 10, 2002, provisional application No. 60/238,809, filed on Oct. 6, 2000.

(51) Int. Cl.
C08F 20/06 (2006.01)
C08F 20/04 (2006.01)
C08F 4/44 (2006.01)
C08F 4/72 (2006.01)

(52) U.S. Cl. .................... 526/91; 526/90; 526/93; 526/94; 526/172; 526/317.1

(58) Field of Classification Search .............. 526/90, 526/91, 93, 94, 172, 317.1
See application file for complete search history.

(56) References Cited

U.S. PATENT DOCUMENTS

| | | | |
|---|---|---|---|
| 3,037,004 A * | 5/1962 | Simone et al. ............... 526/92 |
| 3,183,217 A | 5/1965 | Semiuk et al. |
| 3,959,225 A | 5/1976 | Kuntz |
| 4,007,165 A | 2/1977 | MacLeay et al. |
| 4,374,751 A | 2/1983 | Dudgeon |
| 4,728,706 A | 3/1988 | Farnham et al. |
| 4,940,648 A | 7/1990 | Geiger |
| 4,954,416 A | 9/1990 | Wright et al. |
| 5,089,135 A | 2/1992 | Yoneyama et al. |
| 5,169,914 A | 12/1992 | Kaszas et al. |
| 5,312,871 A | 5/1994 | Mardare et al. |
| 5,405,913 A | 4/1995 | Harwood et al. |
| 5,451,647 A | 9/1995 | Faust et al. |
| 5,470,928 A | 11/1995 | Harwood et al. |
| 5,510,307 A | 4/1996 | Narayanan et al. |
| 5,763,548 A | 6/1998 | Matyjaszewski et al. |
| 5,789,487 A | 8/1998 | Matyjaszewski et al. |
| 5,807,937 A * | 9/1998 | Matyjaszewski et al. ... 526/135 |
| 5,910,549 A | 6/1999 | Matyjaszewski et al. |
| 5,945,491 A | 8/1999 | Matyjaszewski et al. |
| 6,111,022 A | 8/2000 | Matyjaszewski et al. |
| 6,121,371 A | 9/2000 | Matyjaszewski et al. |
| 6,124,411 A | 9/2000 | Matyjaszewski et al. |
| 6,162,882 A | 12/2000 | Matyjaszewski et al. |
| 6,288,186 B1 | 9/2001 | Matyjaszewski et al. |
| 6,407,187 B1 | 6/2002 | Matyjaszewski et al. |
| 6,512,060 B1 | 1/2003 | Matyjaszewski et al. |
| 6,538,091 B1 | 3/2003 | Matyjaszewski et al. |
| 6,541,580 B1 | 4/2003 | Matyjaszewski et al. |
| 6,624,262 B2 | 9/2003 | Matyjaszewski et al. |
| 6,624,263 B2 | 9/2003 | Matyjaszewski et al. |
| 6,627,314 B2 | 9/2003 | Matyjaszewski et al. |
| 2004/0171779 A1 * | 9/2004 | Matyjaszewski et al. 526/303.1 |

FOREIGN PATENT DOCUMENTS

| | | |
|---|---|---|
| EP | 0341012 | 11/1989 |
| EP | 0870809 | 10/1998 |
| WO | WO 97 18247 | 5/1996 |
| WO | WO 98/01480 | 1/1998 |
| WO | WO 00/56795 | 9/2000 |

OTHER PUBLICATIONS

U.S. Appl. No. 10/269,556, filed Oct. 11, 2002.
U.S. Appl. No. 09/359,359, filed Jul. 23, 1999.
U.S. Appl. No. 09/534,827, filed Mar. 23, 2000.
U.S. Appl. No. 09/972,056, filed Oct. 5, 2001.
U.S. Appl. No. 10/034,908, filed Dec. 21, 2001.

(Continued)

Primary Examiner—Roberto Rabago
(74) Attorney, Agent, or Firm—Kirkpatrick & Lockhart Preston Gates Ellis LLP

(57) ABSTRACT

This present invention is directed towards the identification or design, preparation, and use of suitable transition metal complexes for use as catalysts. The transition metal complexes may comprise heterodonor ligands. The present invention is also directed toward a method of determining the suitability of a transition metal complex for use in a catalytic reaction, such as, but not limited to, atom transfer radical polymerization ("ATRP"), atom transfer radical addition ("ATRA"), atom transfer radical cyclization ("ATRC"), and other catalytic redox reactions. The method assists in the approximate determination of the fundamental properties of the transition metal complex in a reaction media, such as, but not limited to, solubility, redox potential, stability towards acidic, basic, or ionic species, conditional radically transferable atom phylicity, and propensity toward disproportionation and therefore, the suitability of the complex to be used as a catalyst in the reaction media. The method provides a basis for prediction and evaluation of the properties of a transition metal complex for a particular selective catalytic reaction in a broad range of reaction environments. An understanding of the principles of the disclosed method allows a transition metal complex to be tuned to specific reaction medium by selecting a transition metal complex and ligand combination having the desired qualities.

42 Claims, 18 Drawing Sheets

OTHER PUBLICATIONS

U.S. Appl. No. 10/118,519, filed Apr. 6, 2002.
U.S. Appl. No. 10/271,025, filed Oct. 15, 2002.
U.S. Appl. No. 10/289,545, filed Nov. 7, 2002.
Carter et al., "Polyimide Nanofoams From Phase-Separated Block Copolymers", Electrochemical Society Proceedings, 1997, pp. 32-43, vol. 97, No. 8, Electrochemical Society, Pennington, NJ, US.
Chen et al., "Pryolytic Behavior and In-Situ Paramagnetism of Star-like C60(CH3)x(PAN)xcopolymers", European Polymer Journal, Mar. 1, 1998, pp. 421-429, vol. 34, No. 3-4, Elsevier Science Ltd., Oxford, GB.
Dorota Greszta et al., "Gradient Copolymers of Styrene and Acrylonitrille Via Atom Transfer Radical Polymerization", Polymer Preprints, Apr. 1997, pp. 709-710, vol. 38(1).
Gromada, J.; Matyjaszewski, K. Macromolecules 2001, 34, 7664-7671.
Jin-Shan Wang and Krzysztof Matyjaszewski, "Controlled /"Living" Radical Polymerization. Atom Transfer Radical Polymerization in the Presence of Transition-Metal Complexes". Reprinted form the Journal of the American Chemical Society, 1995, vol. 117, No. 20, pp. 5614-5615.
Jin-Shan Wang and Krzysztof Matyjaszewski, "Controlled/"Living" Radical Polymerization. Halogen Atom Transfer Radical Polymerization Promoted by a Cu(I)/Cu(II) Redox Process". Reprinted from Macromolecules, 1995. 28. Department of Chemistry, Carnegie Mellon University. Received May 2, 1995; Revised Manuscript Received Aug. 14, 1995, pp. 7901-7910.
Krzysztof Matyjaszewski, Mingli Wei, Jianhui Xia and Nancy E. McDermott, "Controlled/"Living" Radical Polymerization of Styrene and Methly Methacrylate Catalyzed by Iron Complexes1", Macromolecules, vol. 30, No. 26, 1997, pp. 8161-8164.
Krzysztof Matyjaszewski, Simion Coca, Scott G. Gaynor, Mingli Wei and Brian E. Woodworth, "Zerovalent Metals in Controlled/ "Living" Radical Polymerization", Macromolecules, 1997, pp. 7348-7350, vol. 30, No. 23.
Matyjaszewski, K.; Editor Controlled/Living Radical Polymerization. Progress in ATRP, NMP, and RAFT. In: ACS Symp. Ser., 2000; 768, 2000., Chapter 19 "Reverse Atom Transfer Radical Polymerization Using AIBN or BPO as Initiator" pp. 263-275.
Matyjaszewski, K.; Xia, J. Chem. Rev. 2001, 101, 2921-2990.
Mingli Wei, Jianhui Xia, Nancy E. McDermott and Krzysztof Matyjaszewski, "Atom Transfer Radical Polymerization of Styrene in the Presence of Iron Complexes", Polymer Preprints, 38(2), 231 (1997), Department of Chemistry, Carnegie Mellon University.
Qiu, J.; Matyjaszewski, K; Thouin, L.; Amatore, C. Marcromol. Chem. Phys. 2000, 201, 1625-1631.
Queffelec, J.; Gaynor, S.G.; Matyjaszewski, K. Macromolecules 2000, 33, 8629-8639.
Simion Coca, Christina B. Jasieczek, Kathryn L. Beers and Krzysztof Matyjaszewski, "Polymerization of Acrylates by Atom Transfer Radical Polymerization. Homopolymerization of 2-Hydroxyethyl Acrylate", Journal of Polymer Science, 1998, pp. 1417-1424, vol. 36, Part A: Polymer Chemistry.
Seong Mu Jo et al, "Polyacrylonitrile with Low Polydispersities by Atom Transfer Radical Polymerization", Polymer Preprints, vol. 38(1) Apr. 1997, pp. 697-698.
Seong Mu Jo et al, "Effects of Various Copper Salts and Additives on Polymerization of Acrylonitrile by Atom Transfer Radical Polymerization", Polymer Preprints, vol. 38(1) Apr. 1997, pp. 699-700.
Takeichi et al., "Preparation of Porous Carbon Films by the Pyrolysis of Poly(Urethane-imide) Films and Their Pore Characteristics", Carbon, Feb. 2001, pp. 257-265, vol. 39, No. 2.
Timothy E. Patten and Krzysztof Matyjaszewski, Atom Transfer Radical Polymerization and the Synthesis of Polymeric Materials, Advanced Materials 1998 10 No. 12, 901-915.
T.E. Patten et al., "Polymers with very Low Polydispersities from Atom Transfer Radical Polymerization", Science, vol. 272, pp. 866-868, May 10, 1996.
U. Schubert et al., "Design of Effective Systems for Controlled Radical Polymerization of Styrene: Application of 4,4'-Dimethyl and 5,5'-Dimethyl 2,2'-Bipyridine Copper(ii) Complexes", Macromol. Rapid Commun., vol. 20, No. 6, pp. 351-355, 1999.
Wang et al., "Living"/Controlled Radical Polymerization, Transition-Metal-Catalyzed Atom Transfer Radical Polymerization in the Presence of a Conventional Radical Initiator, Macromolecules, 1995, vol. 28, pp. 7572-7573.
Wang, J.-S.; Matyjaszewski, K., J. Am. Chem. Soc. 1995, 117, 5614-5615.
Xia J. and Matyjaszewski K., "Controlled/ "Living" Radical Polymerization. Homogenous Reverse Atom Transfer Radical Polymerization Using AIBN as the Initiator," Macromolecules, 1997, pp. 7692-7696, vol. 30.

* cited by examiner (a)

(b)

(a) (b)

STABILIZATION OF TRANSITION METAL COMPLEXES FOR CATALYSIS IN DIVERSE ENVIRONMENTS

CROSS REFERENCES TO RELATED APPLICATIONS

This application is a continuation in part application claiming priority under 35 U.S.C. § 120 from U.S. patent application Ser. No. 10/625,890 filed on Jul. 23, 2003, now abandoned, which is a divisional of U.S. patent application Ser. No. 09/972,260 filed on Oct. 5, 2001 which issued as U.S. Pat. No. 6,624,262 on Sep. 23, 2002, which claims priority under 35 U.S.C. § 119 from provisional patent application Ser. No. 60/238,809, filed on Oct. 6, 2000, and also claims priority under 35 U.S.C. § 119 from provisional patent application Ser. No. 60/417,591 filed on Oct. 10, 2002.

STATEMENT REGARDING FEDERALY SPONSERED RESEARCH

Some of the work involved development of the invention described in this patent application was partially funded by the Environmental Protection Agency.

FIELD OF INVENTION

This present invention is directed towards the preparation and use of suitable transition metal complexes for use as catalysts. The transition metal complexes may comprise heterodonor ligands. The present invention is also directed toward a method of determining the suitability of a transition metal complex for use in a catalytic reaction, such as, but not limited to, atom transfer radical polymerization ("ATRP"), atom transfer radical addition ("ATRA"), atom transfer radical cyclization ("ATRC"), and other catalytic redox reactions. The method assists in the approximate determination of the fundamental properties of the transition metal complex in a reaction media, such as, but not limited to, solubility, redox potential, stability towards ionic species, conditional radically transferable atom phylicity, and propensity toward disproportionaltion and therefore, the suitability of the complex to be used as a catalyst in the reaction media. The method provides a basis for prediction and evaluation of the properties of a transition metal complex for a particular selective catalytic reaction in a broad range of reaction environments. An understanding of the principles of the disclosed method allows a transition metal complex to be tuned to specific reaction medium by selecting a transition metal complex and ligand combination having the desired qualities.

BACKGROUND OF THE INVENTION

Transition metal complexes are used as catalysts for many organic reactions. Typically, ligands in the transition metal complexes have been selected empirically, based on experience, from a multitude of molecules wherein the donor atoms in the ligand are generally the same element. Several patents describe automated catalyst selection and evaluation systems that may be used to screen a multiplicity of variations in transition metal and catalyst compositions. Changes in catalytic capabilities, including reactivity, solubility and stability, have generally been accomplished merely by modifying the skeletal structure or the donor/acceptor properties of the substituents attached to skeleton of a known functional ligand. While this approach has provided a multitude of useful catalytic materials, there has been a limitation on the ability to tailor a transition metal catalyst for optimum performance in a broad range of reaction environments, for example, ionic, acidic, basic or aqueous systems. To compensate for the lack of understanding of transition metal ligand interactions and functionality, many transition metal complexes must be used in conjunction with co-catalysts to modify the reaction environment or to affect the properties of the complex to allow for an efficient catalytic cycle. In many such dual entity catalytic systems, the co-catalyst and ligand work in conjunction with the transition metal to form an active catalytic complex by modifying the environment of the transition metal thereby modifying and stabilizing certain fundamental properties of the catalyst.

One catalytic reaction process that uses catalytic transition metal complexes is ATRP. The ATRP equilibrium can be expressed as:

Scheme 1:
ATRP reaction equilibrium.

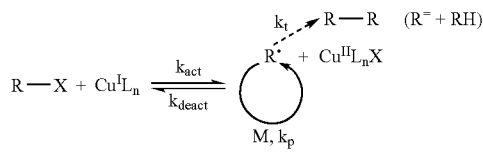

The overall equilibrium constant for ATRP can be expressed as the product of the equilibrium constants for electron transfer between metal complex ($K_{ET}$), electron affinity of the halogen ($K_{EA}$), bond homolysis of the alkyl halide ($K_{BH}$) and heterolytic cleavage of the $CU^{II}$-X bond or "halogen philicity" ($K_{HP}$). Therefore, for a given alkyl halide R—X, more reducing catalysts will increase $K_{ATRP}$ only if $K_{HP}$ stays constant.

Atom Transfer (Overall Equilibrium)

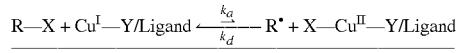

Contributing Reactions

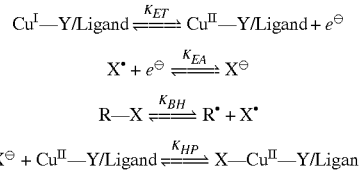

$$K_{ATRP} = \frac{k_a}{k_d} = K_{EA}K_{BH}K_{HP}K_{ET} \text{ or } \frac{K_{ATRP}}{K_{EA}K_{BH}} = K_{ET}K_{HP} \quad (1)$$

ATRP has been discussed in detail in commonly assigned U.S. Pat. Nos. 5,807,937; 5,789,487; 5,910,549; 5,763,548; 5,789,489; 6,111,022; 6,124,411; 6,162,882; 6,407,187; 6,624,262; and 6,538,091; and U.S. patent application Ser. No. 09/534,827; 09/972,046, now U.S. Pat. No. 6,627,314; Ser. No. 09/972,260, now U.S. Pat. No. 6,624,262; Ser. No. 10/625,890, now abandoned, and Ser. No. 10/034,908, now U.S. Pat. No. 7,049,373, the entire contents of which are hereby incorporated herein by reference. U.S. patent application Ser. No. 10/271,025, now U.S. Pat. No. 6,759,491, describes the Simultaneous Reverse and Normal Initiation (SR&NI) process of ATRP that is used in to initiate a polymerization processes in the Examples. U.S. Pat. No. 6,624,262 discloses fundamental parameters that should be considered when attempting to avoid disproportionation. Disproportionation of the higher oxidation state of the catalyst was reduced in U.S. Pat. No. 6,624,262 by an addition of excess ligands to modify the catalyst environment.

Ligands combining different donor atoms from ligands comprising only one type of donor atom has been previously disclosed. For example, the abstract from Brookhart in PMSE Boston Preprints 87, 59, 2002 discloses the preparation and use of bulky bidentate ligands comprising P with N or S or O donor atoms for olefin polymerization in the gaseous phase. No fundamental reason for selection of the donor atom is provided in the abstract. Also, in Polymer Preprints 2002, 43(2), 3, Sawamoto describes the use of ligands comprising phosphorous and nitrogen. These atoms are known to work together in conjunction with ruthenium as suitable counterion/ligand donor atoms for metal mediated polymerization for the polymerization of neutral non-ionic organic monomers. Disclosed is an increase in catalytic activity of the ruthenium complexes via varying ligand-design strategies. Specific discussed were half-metallocene complexes with an electron-donating ligand; ruthenium complexes with a P, N-chelating ligand; and cationic ruthenium complexes with a weakly coordinating anion. The ruthenium complex with a heterodonor ligand was used in a typical organic medium and the only effect noted was an increase in the rate of polymerization that was attributed to improved interaction of the amino donor group compared to amine group. The sole complex also had a lower redox potential than Ru(Cp*)Cl(PPh3)2 (E1/2=0.26V vs 0.46V) and therefore induced more efficient polymerizations of MMA.

PCT publication WO 0151529 describes procatalysts comprising bidentate ligands, catalyst systems, and use in olefin polymerization. The catalyst system comprises a transition metal complex and an alkyl aluminum compound. The transition metal complex will not operate without the alkyl aluminum activator in this dual entity catalyst system. The bidentate ligand is bound to the transition metal by two atoms selected from the group consisting of oxygen, sulfur, selenium, tellurium, nitrogen, phosphorus, arsenic, antimony, and bismuth, or mixtures thereof. However, the catalysts are limited to transition metal comprising titanium, zirconium and hafnium.

PCT publication WO 0187996, (2001) also describes an olefin polymerization catalyst and process and polymer, polymer derivatives, lubricants and fuels thereof. The catalyst described is one having a nitrogen coordinating group and a second coordinating group selected from oxygen, sulfur, selenium and tellurium groups and a metal compd where the metal is a transition metal, boron, aluminum, germanium or tin. The ligands are bidentate ligands and require two carbon atoms as spacers between the donor atoms.

There have been several instances in the prior art inorganic chemistry literature where papers include the description of preparation of transition metal complexes with heterodonor ligands although no utility was described. [Leung, P-H, A Liu, K F Mok, A J P White and D J Williams (1999) "Synthesis and coordination chemistry of a 14-membered macrocyclic ligand containing one phosphorus, two sulfur and one ambidentate sulfoxide donor sets." Journal of the Chemical Society, Dalton Transactions: Inorganic Chemistry(8): 1277-1282. El-Sawaf, A K, D X West, F A El-Saied and R M El-Bahnasawy (1997). "Iron(III), cobalt (II), nickel(II), copper(II) and zinc(II) complexes of 4-formylantipyrine thiosemicarbazone." Synthesis and Reactivity in Inorganic and Metal-Organic Chemistry 27(8): 1127-1147. Certi Mazza, M T, L De Cicco, G De Rosa, R De Rosa and R Caramazza (1996). "Preparation and activity of complexes of transition metals and thiolic heterocyclic ligands." Bollettino—Societa Italiana Biologia Sperimentale 72(3-4): 79-86.] These disclosures provide useful data and properties of transition metal complexes. In the latter paper the chemistry of complexes with thiolic heterocyclic ligands based on the metals binding precisely to the sulphur atom is discussed. Studies were consequently carried out on complexes with thiolic ligands, such as: 2-imidazolidine-thione (IMT), hydantoin (ID), 2-thiohydantoin (TIOID), rhodanine (RD), 2-mercaptoimidazole (MI), 2-mercapto-1-methylimidazole (MMI) and 2-mercaptopyridine (MPYR), which supposed that the co-ordination bond between sulphur and metal is stronger than the possible bond between nitrogen or oxygen and metal due to the minor difference in electronegativity existing between sulphur and metal compared with that existing between nitrogen or oxygen and metal.

Other descriptions and properties of metal complexes with heterodonor ligands may also be found. Jha, R R, D K Sircar, Sadanand and U Jha (1994). "Mixed ligand complexes of bivalent metal ions with 4-amino-5-mercapto-3-methyl-1,2,4-triazole and glycine/alanine." Asian J Chem 6(3): 468-471. Khalil, M M and A H H Elghandour (1993). "Potentiometric studies on the mixed ligand complexes of copper(II), cobalt(II), nickel(II) and zinc(II) with 1-phenyl-3-cinnamoylthiourea and secondary ligands containing oxygen, nitrogen or sulfur as donor atoms." Bull Fac Pharm (Cairo Univ) 31(3): 465-469 and Bernhardt, P V and P Comba (1992). "Molecular mechanics calculations of transition metal complexes." Inorg Chem 31(12): 2638-2644.

SUMMARY

It is to be understood that certain descriptions of the present invention herein have been simplified to illustrate only those elements and limitations that are relevant to a clear understanding of the present invention, while eliminating, for purposes of clarity, other elements. Those of ordinary skill in the art, upon considering the present description of the invention, will recognize that other elements and/or limitations may be desirable in order to implement the present invention. However, because such other elements and/or limitations may be readily ascertained by one of ordinary skill upon considering the present description of the invention, and are not necessary for a complete understanding of the present invention, a discussion of such elements and limitations is not provided herein.

The present invention in certain aspects is directed toward a catalytic process, comprising reacting free radically (co)polymerizable acidic monomers utilizing a suitable transition metal complex as a catalyst. A catalyst is suitable for the reaction if the interactions of the catalyst with the reaction media and the reaction components do not prevent the catalyst from being active in the desired reaction. In certain embodiments, the suitable catalyst may be at least partially soluble in the reaction media, possess a low redox potential, stability towards ionic species, low propensity to disproportionation, and sufficient conditional metal-radically transferable atom or group phylicity to act as a catalyst in the reaction media.

Embodiments of the transition metal complex comprises a heterodonor ligand. The heterodonor ligands may be useful in catalytic reactions in aqueous, polar, acidic, ionic and basic media or with polar, acidic, ionic and basic monomers. The heterodonor ligand may a bidentate or a multidentate ligand. In some embodiments of the process, particularly those conducted in acidic media or other media which may protonate compounds, the heterodonor ligand may comprise a donor atom that cannot be protonated.

In certain aspects, it may be desirable for the transition metal complex to have the following properties sufficient solubility such that at least a portion of the transition metal complex of both oxidation states is soluble in the reaction media, redox potential of less than 500 mV, acidity stability constants of the protonated ligand greater than $10^{-4}$, conditional diproporportionation constant of less than 1000, and conditional metal-radically transferable atom or group phylicity of greater than 10.

Another embodiment of the process is a catalytic process comprising reacting free radically (co)polymerizable acidic monomers utilizing a suitable transition metal complex as a catalyst, wherein the catalytic process is conducted in a polar media. Also, in this embodiment, the transition metal complex can comprises a suitable heterodonor ligand. The heterodonor ligand may have at least two donor atoms each independently selected from the group consisting of oxygen, sulfur, selenium, tellurium, nitrogen, phosphorus, arsenic, antimony, and bismuth.

These and other advantages will be apparent upon consideration of the following description of certain embodiments.

BRIEF DESCRIPTION OF THE FIGURES

Embodiments of the present invention will be understood by reference to the following figures, wherein:

FIGS. 13(a) and 13(b) illustrates ATRP of methacrylic acid using two different catalysts wherein FIG. 13(a) shows the kinetics and FIG. 13(b) shows the evolution of degree of polymerization, DP, with conversion for the system using $CuBr/Na_2EDTDA$ catalyst;

FIGS. 17(a) and 17(b) illustrates ATRP using various initial concentrations of initiator and Cu(II) deactivator wherein FIG. 17(a) shows the kinetics of each reaction and FIG. 17(b) shows the growth in molecular weight versus conversion for same systems as FIG. 17(a).

DESCRIPTION OF THE INVENTION

Figure 1:
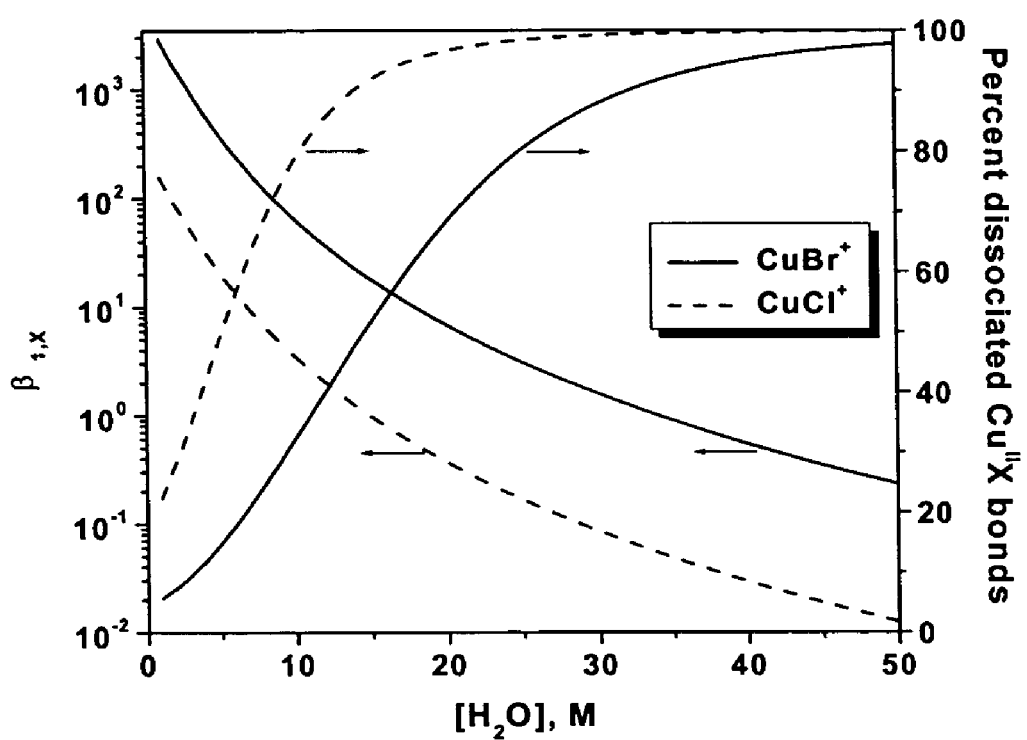
FIG. 1 illustrates calculation of conditional stability constants, $\beta^*_{1,X}$, and the associated percent dissociated $Cu^{II}X$ bonds of the two $Cu^{II}$ monohalide complexes (X=Br or Cl) with water concentration.

This present invention is directed towards the preparation and use of transition metal complexes for use as catalysts. Embodiments of the transition metal complexes may comprise heterodonor ligands. The invention is also directed towards polymerization processes. Embodiments of the process of the present invention include reacting or polymerizing acidic monomers in the presence of a catalyst, such as a suitable transition metal complex. Further embodiments of the method include reacting or polymerizing ionic, acidic or basic monomers in the presence of a suitable transition metal catalyst comprising heterodonor ligands. Further embodiments of the method include reacting or polymerizing ionic, acidic or basic monomers in the presence of a suitable single entity transition metal complex or unimolecular transition metal catalyst system, wherein the transition metal catalyst may comprise heterodonor ligands. Further embodiments of the method include reacting or polymerizing ionic, acidic or basic monomers in a aqueous, polar, acidic or basic media in the presence of a suitable transition metal catalyst comprising heterodonor ligands. The polar media may comprise any polar compounds, such as, but not limited to, aqueous media, and alcohols.

The present invention is also directed toward a method of determining whether a proposed transition metal complex is a suitable catalyst for use specific a catalytic reaction, such as, but not limited to, atom transfer radical polymerization ("ATRP"), atom transfer radical addition ("ATRA"), and atom transfer radical cyclization ("ATRC"). The method assists in the approximate determination of the fundamental properties of the transition metal complex in a reaction media, such as, but not limited to, solubility, redox potential, stability towards ionic species, conditional radically transferable atom phylicity, and propensity toward disproportionaltion and therefore, the suitability of the complex to be used as a catalyst in the reaction media, such as, but not limited to aqueous, ionic, acidic, basic, polar, as well as neutral organic media.

Embodiments of the processes of the present invention may comprise transition metal complex that include heterodonor ligands. In a heterodonor ligand, each donor atom contributes individually and in combination with the other heterodonor atom to the fundamental properties of the transition metal complex. Embodiments of the method provide a basis for prediction and evaluation of the properties of a transition metal complex for a particular catalytic reaction in a broad range of reaction environments. A fundamental understanding of the principles of the disclosed method allows the properties of the catalyst to be tuned to specific reaction medium by selecting the transition metal, the number and the properties of the donor atoms of the ligand and the other ligand substituents. In complexes comprising ligands comprising heterodonor atoms, the two differing chemical functionalities of the donor atoms may be used to combine the properties of a dual entity catalyst system into one ligand to produce transition metal complex that may be used as a suitable single entity catalyst or unimolecular catalyst for use in reactions wherein only dual entity catalyst system have previously been suitable.

An embodiment of the invention comprises the direct controlled polymerization of unsaturated carboxylic acids in an aqueous media with a single entity transition metal complex added to the media as a catalyst. The catalyst may change form in the reaction medium, for example, in some cases, two or more complexes are formed in the reaction medium.

Appropriate ligands may be complexed with a transition metal result in the formation of a suitable catalyst complex that will be at least partially soluble in the reaction media, will not be significantly protonated in the presence of acids or water, nor undergo significant disproportionation, and have the appropriate redox potential to control the reaction. Embodiments of the heterodonor ligand in a transition metal complex may comprise any donor atoms, such as, but not limited to, oxygen, sulfur, selenium, tellurium, nitrogen, phosphorus, arsenic, antimony, and bismuth, or mixtures thereof depending on the targeted reaction. Each of the donor atoms provides different properties to the resulting transitional metal. For example, generally donor atoms that are early in the periodic table, for instance, the first row, stabilize the lower oxidation state of the transition metal complex while those that appear later stabilize the higher oxidation state. Additionally, the electron density of the donor atom this affects the other properties, such as, the donation ability of the radically transferable atom or group and the relative steric properties, as well as other properties. One skilled in the art will be able to determine the appropriate donor atoms to use for a particular reaction. Another factor that has to be taken into account is the bulkiness of the ligand. See, Grubbs, R. H.; et al., Chem. Comm. 2003, 2272-2273.

The methods, transition metals, and processes of the present invention were validated by obtaining values for the parameters of the proposed catalyst complex and determining if the identified transition metal complex could act as a suitable catalyst for the desired reaction. An embodiment of the present invention, for example, could be used to assist in the development of a copper complex comprising a ligand to act as a suitable catalyst for the reaction of unsaturated carboxylic acids in an aqueous media by an ATRP process. An exemplified embodiment of a transition metal complex, method and process of the present invention is the preparation of a target catalyst that allowed the first successful attempt to directly polymerize methacrylic acid in aqueous media by a ATRP. This embodiment is described in detail.

Selection of a Proposed Catalyst

The proposed catalyst in this exemplified embodiment is a unimolecular transition metal complex for the ATRP of free carboxylic acids in homogeneous aqueous solution. Further, the proposed catalyst is a transition metal complex comprising any mono, bi- or multi-dentate ligands. In this example, a transition metal complex comprising heterodonor ligands was desired to provide the combination of properties in one complex such as those available in a two component catalyst system requiring a catalyst modifier in the reaction medium. The ligands selected in this specific instance included ligands that comprised both an oxygen atom (O) and a sulfur atom (S) as donor atoms. These donor atoms were chosen for their favorable properties that may contribute to a suitable catalyst for polymerization of methacrylic acid in aqueous media by an ATRP. For example, sulfur atoms may not be easily protonated in the presence of acidic species and oxygen donor atoms may have the form of a neutral (such as a R—OH, a R—COOR, or ROR') or charged (such as a R—O$^-$ or a R—COO$^-$) donor substituant and still function as a donor. Therefore, a ligand comprising both donors may allow preparation of a single catalytic species that would allow direct transition metal mediated polymerization of acidic monomers in an aqueous media by a single entity catalyst.

At least a basic understanding of the specific requirements of the catalyst for a specific reaction is required to apply the method of the present invention. Typically, many of the parameters required for a transition metal complex to participate as a catalyst in a known reaction are already empirically understood or may be attained by application of the analytical techniques discussed below to a series of known transition metal complexes. One skilled in the art will obtain an understanding of these parameters through disclosure of embodiments of the method of the present invention. The heterodonor ligands may be better able to combine all the catalyst properties into a unimolecular catalyst than ligands comprising only a single donor species. For example, in copper based catalysts for ATRP, ligands comprising only sulfur donor atoms may be good candidates for ligands for the ATRP of acidic monomers, since they form stable complexes that cannot be easily protonated, however, the redox potential of transition metal complexes with sulfur based ligands are often very high, and therefore the activation step of the ATRP process equilibrium is typically either very slow or does not occur, resulting in no or slow polymerization. On the other hand, it is known that ligands comprising only oxygen donor atoms (ethers and ketones but especially charged oxygen species such as phenoxides or carboxylates) stabilize the Cu(II) state of the complex. Transition metal complexes comprising ligands containing oxygen are very reducing and therefore have a high catalytic activity. The combination of these two different donor atoms, namely oxygen and sulfur, in the ligand of a transition metal complex should provide an appropriate balance of properties for the polymerization of acidic monomers in an aqueous media. Initial exemplary transition metal complexes were copper complexes comprising methylthioacetic acid (MTAA) and similar compounds. In the following discussion we use aliphatic ligands but the properties of complex depend not only on the type of donor atom(s) within the ligand but also on whether these atom(s) are part of a $\pi$-based or a $\sigma$-based electron systems. This is another parameter that allows tuning of the catalyst properties discussed herein. The stability constants of the catalyst species were analyzed by an embodiment of the method of the present invention to determine whether these complexes could be suitable for the ATRP of methacylic acid (MAA) in aqueous homogeneous media. Both the Cu(I) and Cu(II) complexes are well-soluble in water (in fact, CuBr can be dissolved in water containing 2-3 equivalents of MTAA). In addition, the redox potential of the copper complexes of a similar ligand, $HO_2CCH_2$—$SCH_2CH_2S$—$CH_2CO_2H$ is known to be significantly lower than the typical copper complexes with sulfur-only-based ligands, and is very close to the redox potential of the copper—pyridine complexes [Augustin, M A, J K Yandell, A W Addison and K D Karlin (1981). "Rates of electron transfer and redox potentials of some copper(II) thioether complexes." Inorg Chim Acta 55(4): L35-L37]. Moreover, the ligand MTAA is itself an acid, which is not easily protonated (at least by relatively weak organic acids), and thus the complexes would be expected to be stable in the presence of MAA.

Detailed Discussion of Method Used in Catalyst Selection and Evaluation

The scope of the invention should not be limited by a discussion of the theory and mechanism of the reactions and equilibrium described herein. This discussion is presented to provide an understanding of the embodiments of the invention.

The formation of unimolecular complexes between a metal (or a metal ion) Mt, and a ligand L, (in the charges of the ionic species may be omitted for simplicity and clarity) is a stepwise process that can be characterized by a set of equilibrium constants:

$$Mt + L \rightleftharpoons MtL \quad K_{1,L} = \frac{[MtL]}{[Mt][L]} = \beta_{1,L}$$

$$MtL + L \rightleftharpoons MtL_2 \quad K_{2,L} = \frac{[MtL_2]}{[MtL][L]} \quad \beta_{2,L} = \frac{[MtL_2]}{[Mt][L]^2} = K_{1,L}K_{2,L}$$

...

$$MtL_{n-1} + L \rightleftharpoons MtL_n \quad K_{n,L} = \frac{[MtL_n]}{[MtL_{n-1}][L]} \quad \beta_{n,L} = \frac{[MtL_n]}{[Mt][L]^n} = K_{1,L}K_{2,L}\ldots K_{n,L} = \prod_{j=1}^{n} K_{j,L}$$

(1)

In the above equations, $K_j$ (j=1–n) are the consecutive (or stepwise) stability (or formation) equilibrium constants and $\beta_i$ are the overall (also cumulative or gross) stability equilibrium constants. [Ringbom, A. *Complexation in analytical chemistry*; Interscience: New York, London, 1963; Vol. XVI.]

In addition to the above equilibrium, typical reactions may involve various side reactions that may interfere with formation of the primary complex. These side reactions may alter the values for the stability constants of the complex of interest. Typical side reactions may include the protonation of the ligand (especially significant when the ligand is a relatively strong base and the reaction media is acidic); formation of additional mixed complexes of the central atom with the solvent or other substances present in the system, such as monomers, salts, buffer components; and reactions with other components. The stability constant of the complex of interest changes to a value which may be termed [Schwarzenbach, G. Die Komplexometrische Titration; 2nd ed.; Enke: Stuttgart, 1956.] as the apparent or conditional stability constant, and is normally denoted by K* or β*.

Ligand Stability Towards Ionic Species and Propensity Toward Ligand Protonation

To illustrate the calculations performed to determine the conditional stability constants and the stability towards ionic species, the formation of the complex MtL in the presence of both an acid, which can protonate the ligand L yielding the acids HL, H2L, . . . , HrL, and another ligand M, which can react with the metal Mt giving the complexes MtM, MtM2, . . . , MtMp may be examined.

The equilibria present in the system are presented in Scheme 2.

Scheme 2

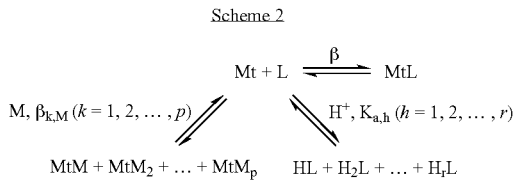

The stability constants of the complexes formed between the metal Mt and the ligand M are designated as $\beta_{1,M}$, $\beta_{2,M}$, . . . , $\beta_{p,M}$ and acidity constants of the protonation of the ligand are $K_{a,1}$, $K_{a2}$, . . . , $K_{a,r}$:

$$\beta_{k,M} = \frac{[MtM_k]}{[Mt][M]^k} \quad (k = 1, 2, \ldots, p)$$

(2)

$$K_{a,h} = \frac{[H][H_{r-h}L]}{[H_{r-h+1}L]} \quad (h = 1, 2, \ldots, r)$$

(3)

The conditional stability constant of the complex MtL is defined analogously to the constants obtained from equations (1), but using the total concentrations of all species containing Mt and L, except MtL:

$$\beta^* = \frac{[MtL]}{([Mt]_{tot} - [MtL])([L]_{tot} - [ML])}$$

$$= \frac{[MtL]}{([Mt] + [MtM] + \ldots + [MtM_p])([L] + [HL] + \ldots + [H_rL])}$$

(4)

The alpha-coefficients for both the metal Mt and the ligand L may be introduced to show the significance of the side reactions (formation of complexes and the protonation). These coefficients are defined as follows:

$$\alpha_{Mt} \equiv \frac{[Mt]_{tot} - [MtL]}{[Mt]} = \frac{[Mt] + [MtM] + \ldots + [MtM_p]}{[Mt]} = 1 + \frac{[MtM]}{[Mt]} + \ldots + \frac{[MtM_p]}{[Mt]} \quad (5)$$

$$\alpha_L \equiv \frac{[L]_{tot} - [MtL]}{[L]} = \frac{[L] + [HL] + [H_2L] + \ldots + [H_rL]}{[L]} = 1 + \frac{[HL]}{[L]} + \frac{[H_2L]}{[L]} + \ldots + \frac{[H_rL]}{[L]} \quad (6)$$

Using equations (2) and (3), the alpha-coefficients can be expressed as:

$$\alpha_{Mt} = 1 + \beta_{1,M}[M] + \ldots + \beta_{p,M}[M]^p = 1 + \sum_{k=1}^{p} \beta_{k,M}[M]^k \quad (7)$$

$$\alpha_L = 1 + \frac{[H]}{K_{a,r}} + \frac{[H]^2}{K_{a,r}K_{a,r-1}} + \ldots + \frac{[H]^r}{K_{a,r}K_{a,r-1}\ldots K_{a,1}}$$

$$= 1 + \sum_{h=1}^{r} \frac{[H]^h}{\prod_{g=r-h+1}^{r} K_{a,g}} \quad (8)$$

From equation (5):

$$[Mt]_{tot} - [MtL] = \alpha_{Mt}[Mt] \quad (9)$$

and from equation (6):

$$[L]_{tot} - [MtL] = \alpha_L[L] \quad (10)$$

Therefore, equation (4) can be rewritten as:

$$\beta^* = \frac{[MtL]}{[Mt][L]} \frac{1}{\alpha_M \alpha_L} = \frac{\beta}{\alpha_M \alpha_L} \quad (11)$$

Clearly, the stability of the MtL complex decreases in the presence of acids and other complexing agents by a factor of $\alpha_M \alpha_L$. The larger the alpha-coefficients, the less stable the complex of interest, MtL will be. (Note that both $\alpha_M$ and $\alpha_L$ are greater than or equal to 1.) The $\alpha_M$ coefficient may be low in the presence of a ligand M forming weak complexes with Mt or at low concentrations of M. Analogously, the $\alpha_L$ coefficient may be low for complexes MtL for which L is as weak base as possible (or the corresponding acids HL, $HL_2$, ..., HL, are strong, i.e. the acidity constants $K_{a,1}$, $K_{a,2}$, ..., $K_{a,r}$ are high), or at low proton concentrations (i.e., either in the presence of weak acids, or at low acid concentration).

A suitable catalyst for use in embodiments of the process of the present invention may be considered to be sufficiently stable toward species participating in side reactions and have a low propensity toward ligand protonation if the all the Ka values of the ligand are greater than $10^{-4}$. In embodiments of the process in which the reaction media has a higher concentration of ionic species, all K* or $\beta^*_{1,\text{ligand}}$ of the ligand should be greater than $10^{-3}$ to provide a suitable catalyst complex.

When the metal ion Mt and the ligand form a series of complexes (MtL, $MtL_2$, ..., $MtL_n$, as shown by the system of equations (1)) rather than the single species MtL, equation (11) can be easily generalized to:

$$\beta^*_{i,L} = \frac{\beta_{i,L}}{\alpha_{Mt}\alpha_L^i} \quad (i = 1, 2, \ldots, n) \quad (12)$$

Equation (12) may be extended for the case when the ligand can react not only with protons but also with other metal ions Mt' present in the system. Clearly, in this case, additional alpha-coefficient for the ligand should be introduced, taking into account the formation of complexes between L and the other metal Mt'. In other words, $\alpha_{L,H}$ and $\alpha_{L,Mt'}$ must be introduced in equation (12).

This concept can best be exemplified by considering the specific case of an ATRP catalyst for the polymerization of acidic monomers in water. The dependence of conditional stability constants and of the percent of dissociated $Cu^{II}$—X bonds based on the concentration of water in the system for the two complexes $CuBr^+$ ($\beta_{1,Br}=5.2\times10^3$ in methanol[Khan, M. A. et. al Inorg. Chem. 1989, 28, 3306-3309] and $CuCl^+$ ($\beta_{1,Cl}=2.8\times10^2$ in methanol may be determined. The stability constants of the first four $Cu^{II}$ aqueous complexes in ethanol are $\beta_{1,aq}=0.589$, $\beta_{2,aq}=0.182$, $\beta_{3,aq}=2.5\times10^{-2}$, and $\beta_{4,aq}=3.0\times10^{-3}$ (the complexes with coordination numbers 5 and 6 have overall stability constants less than $2.0\times10^{-4}$ and their formation can be neglected).[Sillen, L. G.; Martell, A. E. Stability Constants for Metal-Ion Complexes; The Chemical Society, London 1964] For the calculations assume that $C_0=0.1$ M of the copper halide complex is dissolved in the solvent containing different amounts of water.

According to equations (11) and (7), the conditional stability constants of the two $Cu^{II}$ monohalide complexes (X=Br or Cl) can be expressed as:

$$\beta^*_{1,X} = \frac{\beta_{1,X}}{\alpha_{Cu}}$$

$$= \frac{\beta_{1,X}}{1 + \beta_{1,aq}[H_2O] + \beta_{2,aq}[H_2O]^2 + \beta_{3,aq}[H_2O]^3 + \beta_{4,aq}[H_2O]^4}$$

$$= \frac{\beta_{1,X}}{1 + 0.589[H_2O] + 0.182[H_2O]^2 + 2.5 \times 10^{-2}[H_2O]^3 + 3.0\times10^{-3}[H_2O]^4}$$

The above dependence of $\beta^*_{1,X}$ on $[H_2O]$ is shown in FIG. 1.

In the calculations it is assumed that $C_0$ moles of the $CuX^+$ complex is dissolved in the solvent. If y moles of the complex dissociate (i.e., after equilibrium has been reached, $[Cu^{2+}]=[X^-]=y$, the amount of the remaining halide complex is $C_0-y$ moles. Therefore, the equation may be written:

$$\beta_{1,X}^* = \frac{[CuX^+]}{[Cu^{2+}][X^-]} = \frac{C_0 - y}{y^2} \Rightarrow y = \frac{-1 + \sqrt{1 + 4\beta_{1,X}^* C_0}}{2\beta_{1,X}^*}$$

Since $\beta^*_{1,X}$ is a function of the water concentration, y, or $y/C_0 \times 100$, which is the function of interest in this example, also depends on water concentration. FIG. 1 shows the dependence of $y/C_0$ on $[H_2O]$, using $C_0=0.1$ M. The result indicates that cuprous chloride is almost completely dissociated in 20M of water.

Analysis of CuPMDETA Transition Metal Complex

The conditional stability constant of CuPMDETA$^{2+}$ (PMDETA=N,N,N',N'',N''-pentamethyldiethylenetriamine) in 1 M acetic acid may be determined in the same manner. The stability constant of the complex CuPMDETA$^{2+}$ is $\beta_{1,PMDETA}=1.45\times10^{12}$, and the three protonation (or basicity) equilibrium constants of the ligand are $K_{b,1}(PMDETA)=6.03\times10^9$, $K_{b,2}(PMDETA)=1.07\times10^9$, and $K_{b,3}(PMDETA)=2.45\times10^3$. [Smith, R. M.; Martell, A. E. *Critical stability constants, Vol. 2: Amines*; Plenum: New York, 1975.] Acetic acid ($K_a(AcOH)=2.69\times10^{-5}$ at ionic strength 1.0) forms complexes with $Cu^{II}$ with stability constants $\beta_{1,AcO}=51.3$, $\beta_{2,AcO}=5.1\times102$, $\beta_{3,AcO}=1.3\times10^3$, and $\beta_{4,AcO}=7.9\times10^2$ (at ionic strength 1.0). [Martell, A. E.; Smith, R. M.; *Critical Stability Constants, Vol. 3: Other Organi Ligands*; Plenum: New York, 1977.] Compare the determined conditional stability constant with the conditional stability constants of the $Cu^{II}$ complexes with 2,2'-bipyridine (bpy) $\beta^*_{1,bpy}$, $\beta^*_{2,bpy}$, and $\beta^*_{3,bpy}$ at the same conditions, if $\beta_{1,bpy}=1.41\times10^8$, $\beta_{2,bpy}=4.46\times10^{13}$, and $\beta_{3,bpy}=8.90\times10^{16}$. [Sillen, L. G. Martell, A. E.; *Stability Constants of Metal-Ion Complexes Chemical Society*, London1971] The protonation constants for bpy are $K_{b,1}(bpy)=2.63\times10^4$ and $K_{b,2}(bPy)=31.6$. [Smith, R. M.; Martell, A. E. *Critical stability constants, Vol. 2: Amines*; Plenum: New York, 1975]

The acidity constants of the protonated ligand $K_{a,h}(PMDETA)$ (h=1, 2, or 3) are necessary for the calculation of $\alpha_{pMDETA}$, as seen from equation (8). These constants are related to the protonation (or basicity) equilibrium constants of PMDETA; such that:

$$K_{a,h}(PMDETA) = \frac{1}{K_{b,4-h}(PMDETA)} \; (h = 1,2,3)$$

Therefore, the acidity constants of the protonated PMDETA are $K_{a,1}(PMDETA)=4.07\times10^{-4}$, $K_{a,2}(PMDETA)=9.35\times10^{-10}$, and $K_{a,3}(PMDETA)=1.66\times10^{-10}$.

Proton concentration in a moderately dilute solution (the analytical concentration is $C_{AcOH}=1$ M) of the moderately weak acetic acid is given by:

$$[H^+] = \sqrt{K_a(AcOH)C_{AcOH}} = \sqrt{2.69\times10^{-5}} = 5.19\times10^{-3} M$$

[Butler, N.J.; *Ionic Equilibrium; A Methematical Approach*; Addison-Wesley: Reading Mass. 1964]

Thus, the alpha-coefficient taking into account the protonation of the ligand, $\alpha_{PMDETA}$, can be calculated (see equation 8):

$$\alpha_{PMDETA} = 1 + \frac{[H^+]}{K_{a,3}(PMDETA)} + \frac{[H^+]^2}{K_{a,3}(PMDETA)K_{a,2}(PMDETA)} +$$

$$\frac{[H^+]^3}{K_{a,3}(PMDETA)K_{a,2}(PMDETA)K_{a,1}(PMDETA)} =$$

$$1 + \frac{5.19\times10^{-3}}{1.66\times10^{-10}} + \frac{(5.19\times10^{-3})^2}{1.66\times10^{-10}\times9.35\times10^{-10}} +$$

$$\frac{(5.19\times10^{-3})^3}{1.66\times10^{-10}\times9.35\times10^{-10}\times4.07\times10^{-4}} = 2.39\times10^{15}$$

In the above equation $K_{a,h(PMDETA)}$ refers to the acidity of the protonated PMDETA (i.e., the corresponding ammonium salts).

Not only the ligand but also the central metal ion of the complex CuPMDETA$^{2+}$ may participate in a side reaction. The complex-formation of the $Cu^{II}$ ion with the acetate ions produced in the dissociation of acetic acid should be taken into account using another alpha-coefficient, $\alpha_{Cu}$. The concentration of acetate ions, necessary for the calculation of $\alpha_{Cu}$ (see equation 7) can be expressed as:

$$[AcO^-] = \frac{K_a(AcOH)}{[H^+]} = \frac{2.69\times10^{-5}}{5.19\times10^{-3}} = 5.18\times10^{-3}$$

Thus, $$\alpha_{Cu} =$$

$$1 + \beta_{1,AcO}[AcO^-] + \beta_{2,AcO}[AcO^-]^2 + \beta_{3,AcO}[AcO^-]^3 + \beta_{4,AcO}[AcO^-]^4 =$$

$$1 + 51.3\times5.18\times10^{-3} + 5.1\times10^2\times(5.18\times10^{-3})^2 +$$

$$1.3\times10^3\times(5.18\times10^{-3})^3 + 7.9\times10^2\times(5.18\times10^{-3})^4 = 1.28$$

Now, the conditional stability constant of the complex CuPMDETA$^{2+}$ can be determined (equation 11):

$$\beta^*_{1,PMDETA} = \frac{\beta_{1,PMDETA}}{\alpha_{Cu}\alpha_{PMDETA}} = \frac{1.45\times10^{12}}{1.28\times2.39\times10^{15}} = 4.74\times10^{-4}$$

The stability of the CuPMDETA$^{2+}$ complex decreases by more than 16 orders of magnitude in the presence of 1 M acetic acid, due to the protonation of the basic ligand. However, because of the relatively low stability constants of the $Cu^{II}$ acetate complexes, their formation plays practically no role in the decrease of the stability of CuPMDETA$^{2+}$.

Analysis of the Cu bipyridine Transition Metal Complex

The acidity constants of bpy can be calculated in a manner, analogous to the one described above. The values are $K_{a,1}(bpy)=3.16\times10^{-2}$ and $K_{a,2}(bpy)=3.80\times10^{-5}$. With these, the $\alpha_{bpy}$-coefficient can be determined (see equation 8):

$$\alpha_{bpy} = 1 + \frac{[H^+]}{K_{a,2}(bpy)} + \frac{[H^+]^2}{K_{a,2}(bpy)K_{a,1}(bpy)} =$$

$$1 + \frac{5.19 \times 10^{-3}}{3.80 \times 10^{-5}} + \frac{(5.19 \times 10^{-3})^2}{3.80 \times 10^{-5} \times 3.16 \times 10^{-2}} = 1.60 \times 10^2$$

The $\alpha_{Cu}$-coefficient is the same as in the case of CuPMDETA$^{2+}$ complex, and the conditional stability constants for the bpy-complexes of Cu$^{II}$ are (according to (12)):

$$\beta^*_{1,bpy} = \frac{\beta_{1,bpy}}{\alpha_{Cu} \alpha_{bpy}} = \frac{1.41 \times 10^8}{1.28 \times 1.60 \times 10^2} = 6.88 \times 10^5$$

$$\beta^*_{2,bpy} = \frac{\beta_{2,bpy}}{\alpha_{Cu} \alpha^2_{bpy}} = \frac{4.46 \times 10^{13}}{1.28 \times (1.60 \times 10^2)^2} = 1.36 \times 10^9$$

$$\beta^*_{3,bpy} = \frac{\beta_{3,bpy}}{\alpha_{Cu} \alpha^3_{bpy}} = \frac{8.90 \times 10^{16}}{1.28 \times (1.60 \times 10^2)^3} = 1.70 \times 10^{10}$$

It is interesting to note that although under neutral conditions the PMDETA complex of Cu$^{II}$ is four orders of magnitude more stable than the corresponding 1:1 bpy complex, due to the easier protonation of PMDETA. However, in 1 M acetic acid the CuPMDETA$^{2+}$ complex becomes almost eleven orders of magnitude less stable than the complex of the less basic ligand, bpy.

Redox Potential of the Transition Metal Complex

Another parameter that must be considered for selection of a suitable transition metal complex that will allow controlled ATRP of acid monomers in aqueous media is the redox potential of the catalyst.

The redox potential of the couple Cu$^I$/Cu$^{II}$ in the absence of any side reactions (formation of complexes, precipitation of a salt of one of the species, etc.) is given by $$E = E^0 + \frac{RT}{F} \ln \frac{a(Cu^{II})}{a(Cu^I)} = E^0 + \frac{RT}{F} \ln \frac{[Cu^{II}]}{[Cu^I]} + \frac{RT}{F} \ln \frac{\gamma(Cu^{II})}{\gamma(Cu^I)} \quad (13)$$

Both activity coefficients $\gamma$ may be assured to be close to unity, therefore, the last term on the right hand side of equation (13) may be neglected.

The oxidation-reduction equilibrium between Cu$^I$ and Cu$^{II}$ in the presence of a ligand L forming complexes with the copper ions in both oxidation states may be represented in Scheme 3.

Scheme 3

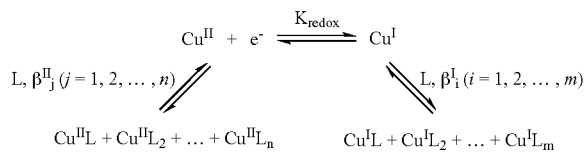

The $\alpha$-coefficients for the copper species participating in complex-formation reactions [Ringbom, A. *Complexation in analytical chemistry*; Interscience: New York, London, 1963; Vol. XVI. Schwarzenbach, G. *Die Komplexometrische Titration;* 2nd ed.; Enke: Stuttgart, 1956. Ringbom, A. *J. Chem. Educ.* 1958, 35, 282-288. Flaschka, H. A. In *EDTA Titrations*; Wiley: New York, 1959. Ringbom, A.; Harju, L. *Anal. Chim. Acta* 1972, 59, 33-47. Ringbom, A.; Haiju, L. *Anal. Chim. Acta* 1972, 59, 49-58. Ringbom, A.; Still, E. *Anal. Chim. Acta* 1972, 59, 143-146. Schwarzenbach, G.; Heller, J. *Helv. Chim. Acta* 1951, 34, 576-591: Tomkinson, J. C.; Williams, R. J. P. *J. Chem. Soc.* 1958, 2010-2018: Rossotti, F. J. C.; Rossotti, H. In *The determination of stability constants*; McGraw-Hill: New York, 1961; pp 127-170; Hawkins, C. J.; Perrin, D. D. *J. Chem. Soc.* 1962, 1351-1357: Buckingham, D. A.; Sargeson, A. M. In *Chelating agents and metal chelates*; Dwyer, F. P., Mellor, D. P., Eds.; Academic press: New York, 1964; pp 237-282: Iakubov, K. M. *Primenenie oksredmetrii k izucheniiu kompleksoobrazovaniia*; Akad. Nauk Tadzhikskoi SSR: Dushanbe, 1966.] (see application Ser. No. 09/972,260, now U.S. Pat. No. 6,624,262) can be applied, and with those, the redox potential can be rewritten as:

$$E = E^0 + \frac{RT}{F} \ln \frac{[Cu^{II}]}{[Cu^I]} = E^0 + \frac{RT}{F} \ln \frac{[Cu^{II}]_{tot}}{[Cu^I]_{tot}} - \frac{RT}{F} \ln \frac{\alpha^{II}}{\alpha^I} = \quad (14)$$

$$E^0 + \frac{RT}{F} \ln \frac{[Cu^{II}]_{tot}}{[Cu^I]_{tot}} - \frac{RT}{F} \ln \frac{1 + \sum_{j=1}^n \beta^{II}_j [L]^j}{1 + \sum_{i=1}^m \beta^I_i [L]^i}$$

By means of equation (14) the redox potential of the couple Cu$^I$/Cu$^{II}$ can be calculated, provided that all stability constants are known. Alternatively, stability constants of complexes can be determined using electrochemical measurements. [Hawkins, C. J.; Perrin, D. D. *J. Chem. Soc.* 1962, 1351-1357. Calvin, M.; Wilson, K. W. *J. Am. Chem. Soc.* 1945, 67, 2003-2007. Perrin, D. D. *J. Chem. Soc.* 1958, 3120-3124. Perrin, D. D. *J. Am. Chem. Soc.* 1958, 80,3852-3856. Perrin, D. D. *J. Chem. Soc.* 1958, 3125-3128. Perrin, D. D. *J. Chem. Soc.* 1959, 290-296. Perrin, D. D. *J. Chem. Soc.* 1959, 1710-1717. Fronaeus, S. In *Technique of Inorganic Chemistry*; Jonassen, H. B., Weissberger, A., Eds.; Wiley: New York, 1963; Vol. 1, pp 1-36], all herein incorporated by reference.

The redox potential of the Cu$^I$/Cu$^{II}$ couple may be determined and the adequacy of the transition metal complex for a certain reaction determined by equation (13). A suitable catalyst for use in embodiments of the processes of the present invention may be considered to have a sufficient redox potential if E is less than 500 mV. In certain embodiments of the processes in which a higher reaction rate is desired, E may be less than 400 mV, for the highest rates of reaction, E may be less than 100 mV for the transition metal complex.

Propensity Toward Disproportionation of the Transition Metal Complex

Disproportionation of the transition metal complex is another parameter that has to be considered when determining the suitability of a particular catalyst in a certain environment, for example, the reaction of Cu$^I$ containing species to give a Cu$^{II}$ species and Cu$^0$.

Navan N., et. al. *Inorg. Chem* 38 3484-88 (1999) indicated that in order suppress such a disproportionation reaction it is necessary to use a ligand wherein the Cu$^I$ complex is more stable than the Cu$^{II}$ complex. Datta, D., *Ind. J. Chem* 26A 860 (1987) The polarity of the medium is another factor that influences the equilibrium constant for the disproportionation of Cu$^I$ as defined by equation (2.0).

$$K_{disp} = \frac{[Cu^{II}]}{[Cu^{I}]^2} \qquad (2.0)$$

It has been shown that $\log K_{disp}$ decreases with decreasing the polarity of the solvent $\epsilon$ in the order: water ($\epsilon=78.54$) $\log K_{disp}=6.00$ [Fenwick, F., *J. Am. Chem. Soc.*, 48, 860 (1926)], methanol ($\epsilon=32.63$) $\log K_{disp}=3.55$ and ethanol ($\epsilon=24.33$) $\log K_{disp}=0.55$, [Randles, J. E. B., *J. Chem. Soc.*, 802 (1941)], and acetone ($\epsilon=20.70$) $\log K_{disp}=-1.50$ [Coetzee, J. F., Siao, W., *Inorg. Chem.*, 2, 14 (1963)]. This strong dependence on the polarity of the solvent can be explained using the Born solvation model, i.e. assuming that the solvent-solute interactions are of purely electrostatic origin.

Even in the presence of ligands preferentially stabilizing $Cu^I$, such as 2,2'-bipyridyl (bpy), disproportionation may be observed when some salts, including ionic monomers, are added to an aqueous system (for example, high concentration of the monomer 2-trimethylammonioethyl methacrylate triflate)—these ionic species can significantly increase the polarity of the system and thus increase $K_{disp}$. If the $K_{disp}$ is too high, the disproportionation reaction should be suppressed in order to provide a suitable transition metal complex that can catalyze an ATRP reaction, for example, and that this can be accomplished by the addition of a large excess of a ligand capable of stabilizing the $Cu^I$ rather than the $Cu^{II}$ oxidation state of the catalyst complex. In the absence of compounds increasing the polarity of the medium, no disproportionation is observed when bpy is used as the ligand in aqueous solution.

The fundamental basis for the above interpretation, and resulting procedures we teach herein for conducting a controlled transition metal mediated polymerization in highly polar media, can be reached by considering the disproportionation reaction in the presence of a ligand L, (the case covering addition of several molecules that can function as ligands will be also considered), forming complexes with both copper ions, can be schematically represented as:

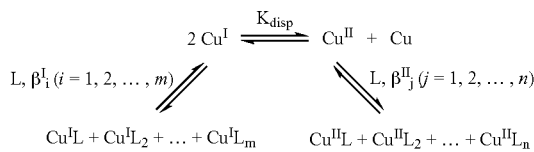

In the above scheme, $K_{disp}$ is the disproportionation equilibrium constant in the absence of any side reactions, $\beta^I_i$ and $\beta^{II}_j$ are the overall stability constants of the complexes of $Cu^I$ and $Cu^{II}$ with the ligand L, respectively.

The conditional constant of disproportionation $K_{disp}^*$ is analogous to other conditional equilibrium constants discussed by Schwarzenbach, G., *Die Komplexometrische Titration*, 2$^{nd}$ Ed., F. Enke, Stuttgart, 1956; Ringbom, A., *J. Chem. Educ.*, 35, 282-88 (1958); Flaschka, H. A., *EDTA Titrations*, Pergamon, New York, 1959, Ch. 4; Ringbom, A., *Complexation in Analytical Chemistry*, Interscience, New York, London, 1963; Ringbom, A., Harju, L., *Anal. Chim. Acta*, 59, 33-47; Ringbom, A., Still, E., *Anal. Chim. Acta*, 59, 143-6 (1972); and Smith, R. M., Martell, A. E., *Critical Stability Constants, Vol. 2: Amines*, Plenum, New York, 1975. It is given by the total equilibrium concentrations of all copper species, i.e., the sum of the concentrations of free ions and all copper complexes present in the system. Thus, one can write:

$$K_{disp}^* = \frac{[Cu^{II}]_{tot}}{[Cu^{I}]_{tot}^2} \qquad (2.1)$$

Now, $\alpha$-coefficients for the copper species participating in side complex-formation reactions, showing the significance of these reactions, are defined as:

$$\alpha^I = \frac{[Cu^I]_{tot}}{[Cu^I]} = \frac{[Cu^I] + \sum_{i=1}^{m}[Cu^I L_i]}{[Cu^I]} = 1 + \sum_{i=1}^{m}\beta^I_i[L]^i \qquad (2.2)$$

$$\alpha^{II} = \frac{[Cu^{II}]_{tot}}{[Cu^{II}]} = \frac{[Cu^{II}] + \sum_{j=1}^{n}[Cu^{II} L_j]}{[Cu^{II}]} = 1 + \sum_{j=1}^{n}\beta^{II}_j[L]^j \qquad (2.3)$$

With those, the conditional equilibrium constant $K_{disp}^*$ can be rewritten as:

$$K_{disp}^* = \frac{\alpha^{II}[Cu^{II}]}{(\alpha^I)^2[Cu^I]} = \frac{\alpha^{II}}{(\alpha^I)^2} K_{disp} \qquad (2.4)$$

The above relation clearly shows that if the ligand L forms more stable complexes with the lower-oxidation state copper ion than with the higher oxidation state copper ion, then the disproportionation reaction can be largely suppressed. It also demonstrates the possibility to "adjust" this equilibrium as desired by using an appropriate ligand at the appropriate concentrations. It should be noted that even if a ligand is not strongly-binding to either $Cu^I$ or $Cu^{II}$ but it is present in large excess, e.g., if it can be added as a solvent, or if it is a monomer in the polymerization reaction, indeed it is possible that the monomer can be the only ligand in the reaction medium, it can still significantly suppress the disproporionation provided that the ratio $\alpha^{II}/(\alpha^I)^2$ is much less than unity. The limited success that has been attained for the controlled ATRP of polar or ionic monomers has occurred when the monomer or macroinitiator can form a complex with the $Cu^I$ species.

Let us now consider the case when two ligands L and M are present in the system. The overall stability constants of the complexes will now be designated as $\beta^I_{i,L}$(i=1, 2, ..., m), $\beta^{II}_{j,L}$(j=1, 2, ..., n) (for the $Cu^I$ and $Cu^{II}$ complexes of the ligand L, respectively), $\beta^I_{k,M}$(k=1, 2, ..., p), and $\beta^{II}_{l,M}$(l=1, 2, ..., q) (for the corresponding complexes of $Cu^I$ and $Cu^{II}$ with M). Again, $\alpha$-factors for both $Cu^I$ and $Cu^{II}$ for both ligands L and M can be used, and for each oxidation state of copper, the $\alpha$-coefficient is the sum of the coefficients for both ligands minus one, i.e. [Ringbom, A., *Complexation in Analytical Chemistry*, Interscience, New York, London, 1963]:

$$\alpha^I = \alpha^{I,L} + \alpha^{I,M} - 1 = 1 + \sum_{i=1}^{m}\beta^I_{i,L}[L]^i + \sum_{k=1}^{p}\beta^I_{k,M}[M]^k \qquad (2.5)$$

$$\alpha^{II} = \alpha^{II,L} + \alpha^{II,M} - 1 = 1 + \sum_{j=1}^{n} \beta_{j,L}^{II}[L]^j + \sum_{l=1}^{q} \beta_{l,M}^{II}[M]^l \quad (2.6)$$

The conditional disproportionation constant can be expressed exactly as above (Eq. 2.4) but using the new definitions of the α-coefficients.

The outlined approach can be extended for more than two side reactions (i.e., with more than two ligands present); it should only be born in mind that the α-coefficient for each species ($Cu^I$ or $Cu^{II}$) is a sum of the α-coefficients for all of the side reactions, minus the number of these reactions plus one.

A suitable catalyst for use in embodiments of the process of the present invention may be considered to have a sufficiently low propensity toward disproportionation if all the $K^*_{disp}$ values of the transition metal complex are below $10^3$. In certain embodiments of the process, the $K^*_{disp}$ of the transition metal complex may be desired to be below $10^2$ or in embodiments wherein the concentration of the activator species is to be maintained in greater quantities the $K^*_{disp}$ of the transition metal complex may be desired to be less than 10 or even $10^{-1}$.

Conditional Radically Transferable Atom or Group Phylicity and Stability of the Transition Metal-Radically Transferable Atom or Group Another parameter to take into account in the selection of a suitable ATRP catalyst is the stability of the higher oxidation state of the complex or the stability of the transition metal-halogen bond. The following discussion will be based upon the example wherein the radically transferable atom or group in the ATRP process is a halogen, but the same analysis could be considered for any other radically transferable atom or group. If the higher oxidation state, the deactivator in redox reactions, dissociates easily, its concentration in the reaction system will be lowered and the deactivation process may consequently be slower which may ultimately lead to a poorly controlled reaction polymerization in some embodiments. The ligand should be selected in such a way that the stability of the Cu(II)-X bond is sufficiently strong to persist in the reaction medium to form a suitable catalyst.

The rate of deactivation in ATRP $R_{deact}$, see scheme 1, depends on the concentration of $Cu^{II}$ complex with coordinated halide ligand, i.e., on $[Cu^{II}X]$, and is given by $$R_{deact} = k_{deact}[R^*][Cu^{II}X] \quad (15)$$

The calculation of the actual concentration of deactivator ($Cu^{II}X$) present in the reaction mixture will be the subject of the following discussion.

The reversible formation/dissociation of the $Cu^{II}$-based ATRP deactivator (16) is characterized either by the overall (gross) or the stepwise stability (formation) constant, designated by $\beta_{1,X}$ and $K_{1,X}$, respectively (the index 1 shows the number of coordinated ligands X):

(16)

$$\beta_{1,X} = K_{1,X} = \frac{[Cu^{II}X]}{[Cu^{II}][X]} \quad (17)$$

In any reaction medium some part of the complex $Cu^{II}X$ formed in the ATRP equilibrium during the polymerization reaction or added initially to the reaction mixture, may dissociate forming a $Cu^{II}$-containing species with no coordinated halide ligand. This complex cannot deactivate radicals. The percent of dissociated (and therefore—"lost") deactivator can be correlated with $\beta_{1,X}$ and with the total concentration of $Cu^{II}$-containing species in the system. Assume that at the initial state all $Cu^{II}$ is in the form of $Cu^{II}X$ and therefore the total (analytical) concentration of $Cu^{II}$ is $[Cu^{II}]_{tot}=[Cu^{II}X]_0$. After the equilibrium (16) has been established, $[Cu^{II}]_{tot}=[Cu^{II}X]+[Cu^{II}]$, where $[Cu^{II}]$ is the concentration of dissociated deactivator. From (17):

$$\beta_{1,X} = \frac{[Cu^{II}]_{tot} - [Cu^{II}]}{[Cu^{II}][X]} = \frac{[Cu^{II}]_{tot} - [Cu^{II}]}{[Cu^{II}]^2} \quad (18)$$

Therefore, the percent of "lost" deactivator, i.e., of dissociated $Cu^{II}$—X bonds, is given by:

$$\begin{aligned}\text{Percent dissociated } Cu^{II}X &= \frac{[Cu^{II}]}{[Cu^{II}]_{tot}} \times 100 \\ &= \frac{-1 + \sqrt{1 + 4\beta_{1,X}[Cu^{II}]_{tot}}}{2\beta_{1,X}[Cu^{II}]_{tot}} \times 100\end{aligned} \quad (19)$$

Figure 2:
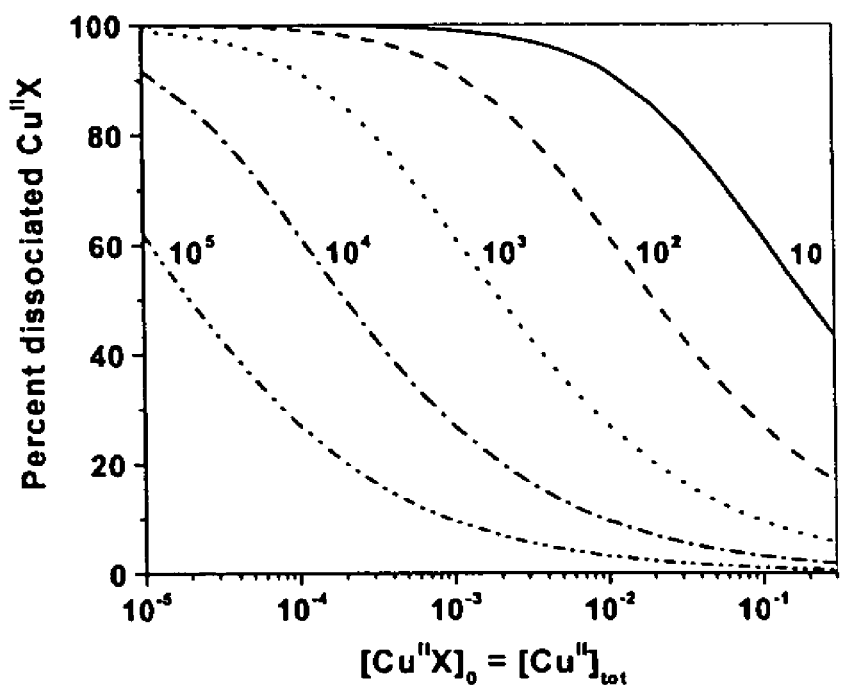
FIG. 2 illustrates dependence of percent dissociated deactivator on the initial concentration of deactivator $[Cu^{II}X]_0 = [Cu^{II}]_{tot}$; the value of $\beta_{1,X}$ from 10 to $10^5$ is given at each curve.

The above dependence is plotted in FIG. 2 for various values of $\beta_{1,X}$. In ATRP systems using "conventional" solvents (hydrocarbons, ethers, DMF, etc.) the value of $\beta_{1,X}$ is of the order of $10^4$-$10^5$, meaning that deactivator loss via dissociation is insignificant. For example, less than 10% of the deactivator is dissociated for initial concentrations above $10^{-3}$ M and less than 5% for initial concentrations above $5\times10^{-2}$ M if $\beta_{1,X}=10^5$. However, in polar protic solvents, such as alcohols or water, the dissociation of the complex $Cu^{II}X$ may become a significant process because the values of $\beta_{1,X}$ in these solvents is of the order of 10-$10^3$.

A suitable catalyst for use in embodiments of the process of the present invention may be considered have a sufficiently stable transition metal-radically transferable atom or group bond if the conditional stability of the bond is above 10. In certain embodiments of the processes it may be desired that the conditional stability of the bond is greater than 1000 or more preferably greater than 5000.

The remaining, non-dissociated, deactivator participates in the deactivation process and its concentration can also be determined from equation 17:

$$\beta_{1,X} = \frac{[Cu^{II}X]}{([Cu^{II}]_{tot} - [Cu^{II}X])[X]} \quad (20)$$

$$[Cu^{II}X] = \frac{\beta_{1,X}[Cu^{II}]_{tot}[X]}{1 + \beta_{1,X}[X]} \quad (21)$$

Inserting equation (21) into (15), an expression for the rate of deactivation in a conventional ATRP system $R_{deact}$ is obtained $$R_{deact} = k_{deact}[R^{\bullet}] \frac{\beta_{1,X}[Cu^{II}]_{tot}[X]}{1+\beta_{1,X}[X]} \quad (22)$$

Equations (21) and (22) may not be convenient to use because the concentration of free, non-coordinated, halide ions are generally unknown quantities. It is more useful to determine the dependence of $[Cu^{II}X]$ and $R_{deact}$ on the total concentrations $[Cu^{II}]_{tot}$ and $[X]_{tot}$, which can be done by solving a quadratic equation. Assume a $Cu^{II}$ compound (total concentration $[Cu^{II}_{tot}]$) and a halide (total concentration $[X]_{tot}$) are mixed. After formation of the complex $Cu^{II}X$, the concentrations of free $Cu^{II}$ and X are $[Cu^{II}]=[Cu^{II}]_{tot}-[Cu^{II}X]$ and $[X]=[X]_{tot}-[Cu^{II}X]$, respectively. These concentrations can be plugged into (17) and the resulting equation (24) can be solved for $[Cu^{II}X]$:

$$\beta_{1,X} = \frac{[Cu^{II}X]}{([Cu^{II}]_{tot}-[Cu^{II}X])([X]_{tot}-[Cu^{II}X])} \quad (23)$$

$$\beta_{1,X}[Cu^{II}X]^2 - (1+\beta_{1,X}[Cu^{II}]_{tot}+\beta_{1,X}[X]_{tot})[Cu^{II}X]+\beta_{1,X}[Cu^{II}]_{tot}[X]_{tot}=0 \quad (24)$$

$$[Cu^{II}X] = \frac{(1+\beta_{1,X}[Cu^{II}]_{tot}+\beta_{1,X}[X]_{tot}) - \sqrt{(1+\beta_{1,X}[Cu^{II}]_{tot}+\beta_{1,X}[X]_{tot})^2 - 4\beta_{1,X}^2[Cu^{II}]_{tot}[X]_{tot}}}{2\beta_{1,X}} \quad (25)$$

Figure 3:
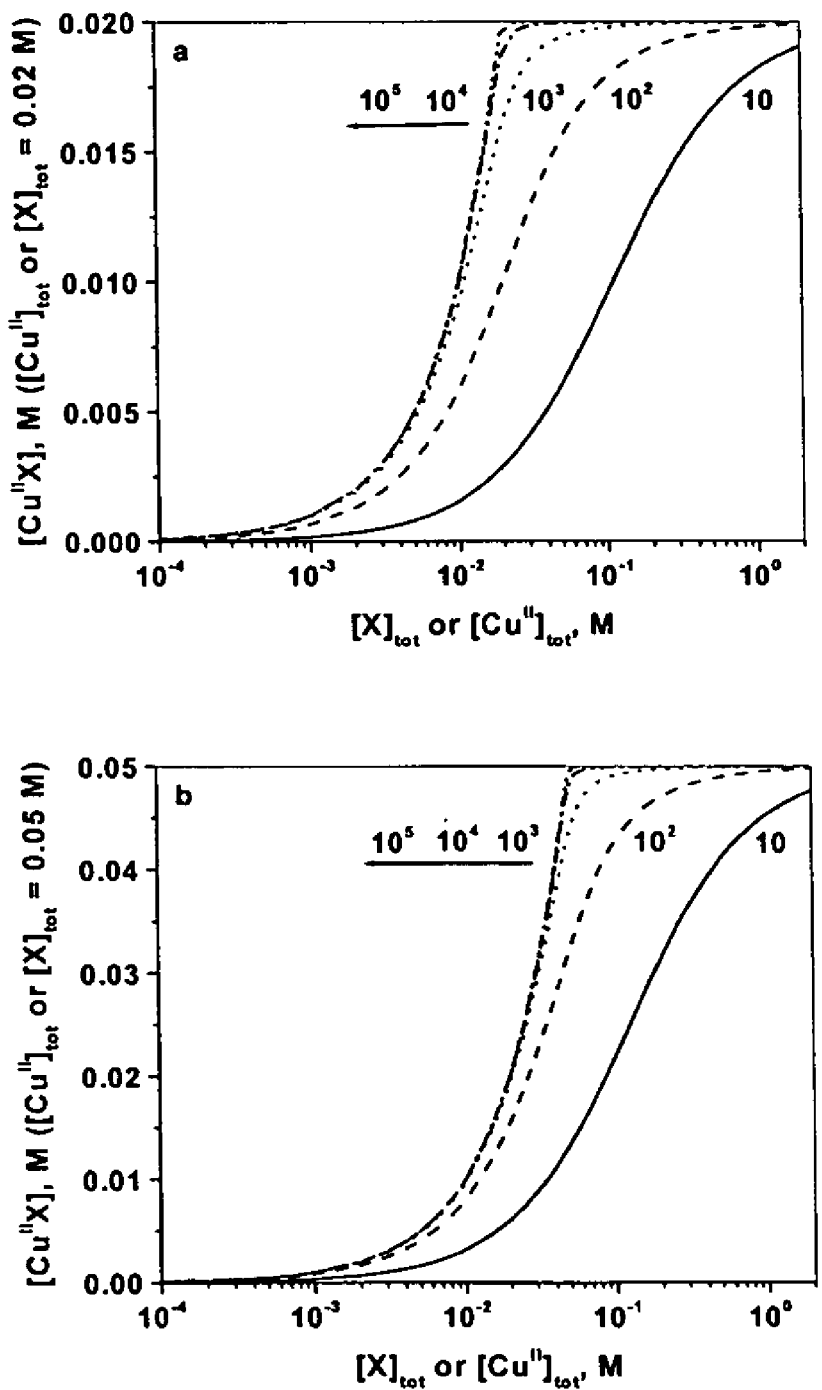
FIGS. 3(a) and 3(b) illustrates dependence of $[Cu^{II}X]$ on the total concentration of $Cu^{II}$ or X, with one of the concentrations fixed at 0.02 M, FIG. 3(a) or 0.05 M, FIG. 3(b), the value of $\beta_{1,X}$ from $10$-$10^5$ is given at each curve.

The dependence (25) is plotted in FIG. 3 for several different values of the stability constant $\beta_{1,X}$. In this Figure, one of the concentrations $[Cu^{II}]_{tot}$ or $[X]_{tot}$ is fixed at 0.02 M or 0.05 M while the other is being varied.

In order obtain the information required for use these equations to improve the efficiency of catalyst identification/selection/evaluation a number of spectral analytical tools were optimized to provide the information required. The tools described below were employed for the study and used in concert to determine some of these critical catalyst parameters.

We herein demonstrate that once the critical catalyst parameters have been identified, and values determined using spectroscopy, the catalyst complexes comprising the heteroatom-donor ligands, thereby identified as suitable can be used in catalytic processes with high expectations for success.

We teach herein how such complexes can be evaluated for catalytic activity in a targeted reaction.

There has been one report concerning the use of thiophenecarboxylic acid in an ATRP reaction; U.S. application Ser. No. 09/018,554, now U.S. Pat. No. 6,538,091, and the divisional application Ser. No. 09/369,157, now U.S. Pat. No. 6,541,580. In this earlier application we taught that Cu(I) 2-thiophenecarboxylate worked as a counterion/ligand in conjunction with a di-nonyl-bipyridine ligand to allow polymerization of styrene at increased rates. In this application the heterodonor ligand is the sole ligand forming the complex.

DETAILED DISCUSSION ON MEASURING THE PARAMETERS REQUIRED FOR IDENTIFICATION OF A SUITABLE ACTIVE CATALYST COMPLEX

Figure 4:
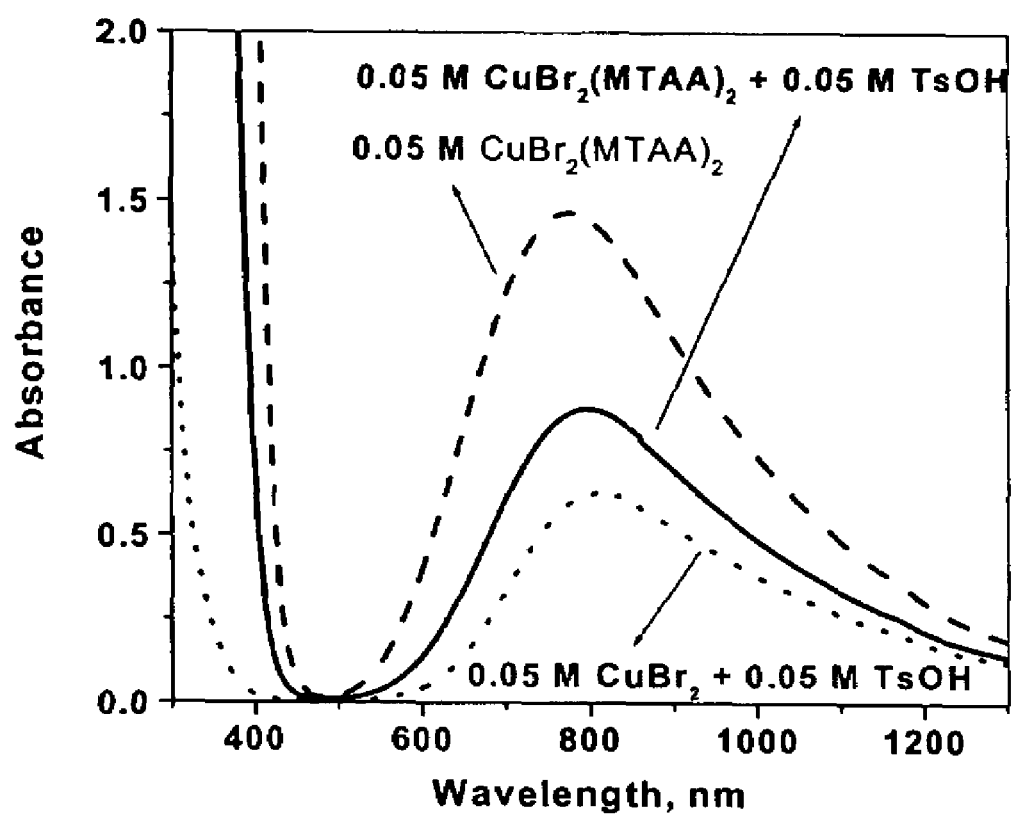
FIG. 4 illustrates electronic spectra of $CuBr_2$ complex of MTAA, the same complex in the presence of 4-toluenesulfonic acid, and $CuBr_2$ in the presence of the acid, the spectra were measured in water.

An examination of the electronic spectra of copper (II) complexes of an exemplary heterodonor bidentate ligand; methylthioacetic acid [Cu(II)MTAA complex] (FIG. 4), provides some evidence that the complex is not very stable in the presence of strong acids (such as 4-toluenesulfonic acid) however the electronic spectrum does show that even in the presence of such a strong acid, apparently, there is some remaining complex (compare the spectra of the complex and $CuBr_2$ in the presence of acid) that could still participate in a catalytic cycle.

Initial experiments, examples 1 & 2 below, indicated that the concept worked but we expected that a tetradentate complex might be more stable towards degradation by protonation and more soluble in the reaction medium. The copper complexes of the tetradentate ligand ethyl-1,2 dithiodiacrylic acid (EDTDAA, $HOOCCH_2SCH_2CH_2SCH_2COOH$) would be expected to be more stable than those of MTAA and more suitable for the formation of copper complexes for controlled polymerization of methacrylic acid in polar media. These complexes were examined, initially, by spectroscopic examination of specific stability/activity parameters, and then, after suitability was confirmed, experimentally.

Unfortunately, the acid ligand (EDTDAA) is not soluble in water or methanol, but if it is converted to its sodium salt ($Na_2EDTDAA$), a ligand readily soluble in both solvents is formed. Cuprous bromide (CuBr) is readily soluble in an aqueous solution of $Na_2EDTDAA$, giving a colorless solution of the cuprous complex. The green Cu(II) complex is soluble to a sufficient degree as well. It has been reported [Augustin, M A, J K Yandell, A W Addison and K D Karlin (1981). "Rates of electron transfer and redox potentials of some copper(II) thioether complexes." Inorg Chim Acta 55(4): L35-L37] that the redox potential of the copper complex with this ligand is very close to that of the redox complex formed with pyridine as ligand, making $Na_2EDTDAA$ a very promising candidate as a ligand for ATRP.

The other issue, which needs to be studied is the stability of both Cu(I) and Cu(II) complexes in the reaction medium. Here, an attempt was made to characterize the cuprous complex using $^1H$ NMR spectroscopy. However, the presence of any free ligand in solution results in rapid exchange with the complexed ligand making any direct determination of the stability (and also of the chemical shifts) of the complex very difficult.

Herein, we demonstrate that $^1H$ NMR spectroscopy conducted at room temperature can be used to study the complex.

Consider the equilibrium:

$$M + L \underset{}{\overset{K}{\rightleftharpoons}} ML \quad (23)$$

If a series of solutions (j is the index for the number of solution) is prepared, the equilibrium constant K can be expressed as:

$$K = \frac{[ML]_j}{[M]_j[L]_j} = \frac{x_j}{([M]_{0,j} - x_j)([L]_{0,j} - x_j)} \quad (24)$$

In the above equation $x_j$ is the concentration of the complex in the j-th solution after equilibrium has been reached. From (16):

$$x_j = \frac{KC_j^{tot} + 1 \pm \sqrt{(KC_j^{tot} + 1)^2 - 4K^2 P_j}}{2K[L]_{0,j}} \quad (25)$$

In (25), $C_j^{tot}$ is the sum of concentrations of the initially added metal and ligand, and $P_j$ is the product of these concentrations. If a fast (on the NMR time-scale) exchange between the free and the complexed ligand occurs, separate NMR signals of the two species (free ligand L and complexed ligand C) cannot be seen, but the observed chemical shift of the i-th peak of the ligand can be expressed as:

$$\delta_{i,j}^{obs} = \delta_i^L + (\delta_i^C - \delta_i^L)\chi_j^C \quad (26)$$

In (18), $\chi_j^C$ is the molar fraction of the complexed ligand in the j-th solution, i.e.:

$$\chi_j^C = \frac{[ML]_j}{[L]_j + [ML]_j} = \frac{x_j}{[L]_{0,j}} \quad (27)$$

Combining equations (25)-(27), one obtains:

$$\delta_{i,j}^{obs} = \delta_i^L + (\delta_i^C - \delta_i^L)\frac{KC_j^{tot} + 1 \pm \sqrt{(KC_j^{tot} + 1)^2 - 4K^2 P_j}}{2K[L]_{0,j}} \quad (28)$$

In the case of stable complex (and especially for large initial concentrations of both the metal and the ligand), equation (28) is simplified to:

$$\delta_{i,j}^{obs} = \delta_i^L + (\delta_i^C - \delta_i^L)\frac{[M]_{0,j}}{[L]_{0,j}} \quad (29)$$

If the formed complex is stable, it is to be expected that a plot of $\delta_{i,j}^{obs} - \delta_i^L$ vs. $[M]_{0,j}/[L]_{0,j}$ would be a straight line with no intercept. Therefore, the linearity of such a plot and the absence of an intercept could be used as a criterion for the stability of the formed complex. Moreover, from the slope, the chemical shifts of the signals of the complexed ligand can be calculated, and plugging these values back into equation (25), one can evaluate the stability constant.

To our knowledge, this is a new approach that provides at least a qualitative, characterization (determination of chemical shifts, which gives very important structural information) of complexes, in which the free ligand exchanges rapidly with the complexed one, and provides a way to determine stability constants of transition metal complexes in a number of environments. E.g. this can be used to characterize the coordination of olefins to Cu(I), or any other transition metal complex, and provide information on whether the complexed monomer is available for copolymerization with other olefins or with vinyl monomers etc.

Figure 5:
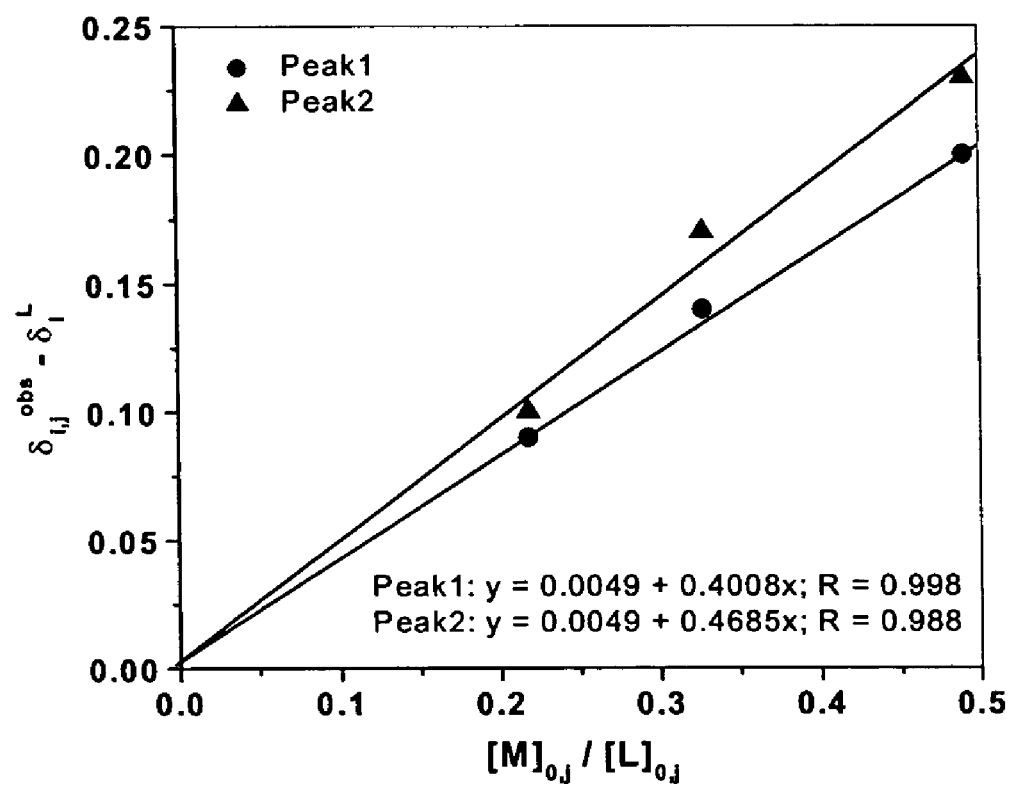
FIG. 5 illustrates plot of observed chemical shifts vs. concentration for peak maxima of Cu(I) complex of $Na_2EDTDAA$, indicating two linear curve with intercepts near zero.

This outlined, broadly applicable, approach was used to determine the chemical shifts and evaluate the stability of the Cu(I) complexes of Na$_2$EDTDAA, for suitability for the aqueous ATRP of acidic monomers. The plots of $\delta_{ij}^{obs} - \delta_i^L$ vs. $[M]_{0,j}/[L]_{0,j}$ are shown in FIG. 5, the intercepts of a straight line drawn through the data points are both very close to zero, as expected for a stable complex. The determined values for the chemical shifts of the complexed ligand from the slopes are $\delta_1^C = 3.78$ ppm and $\delta_2^C = 3.43$ ppm. The equilibrium constant can be evaluated from the values of the chemical shifts. Of course, the stability constant may be determined more accurately, by an iterative procedure, but from this level of information alone the value of the equilibrium constant can be safely taken as >1000.

In conclusion, by studying the NMR spectra of the Cu(I) complex of Na$_2$EDTDAA its spectral characteristics can be determined, and hence the stability of the complex has been evaluated. This study indicates that the complex is of sufficient stability to be used as an activator in the aqueous ATRP of acidic monomers. In addition, protonation of the ligand is not a likely process, due to its low basicity.

The Cu(II) complexes of EDTDAA were also studied in order to determine if this species can act as deactivator in an ATRP reaction. In this study IR was employed to determine the mode of coordination of the ligand to the transition metal and UV/Vis spectroscopy was used to study stability. The spectra indicate that the complex is hydrated or the water molecule is coordinated to the copper ion. To precisely determine if the water is coordinated or is crystal lattice water, the same complex was prepared in D$_2$O and the IR spectra of the deuterated and the "normal" hydrate are compared, FIG. 6. The spectra show that water is coordinated to the copper ion. Therefore, the Cu(II) is pentacoordinated in these EDTDAA complexes and it is very likely that the water molecules can be displaced by other ligands such as halide anions, thus generating the necessary deactivating species for ATRP.

The spectra indicates that both the carboxylate oxygen and thioether sulfur atoms are involved. (Note the shift of the vibration frequency of the CS bond upon coordination. The shape of the band corresponding to asymmetric COO vibration also changes upon coordination due to the change of symmetry (C$_{2v}$ in the ionic sodium salt to C$_s$ in the complex), indicating the participation of the carboxylate group in the complex-formation. [Nakamoto, K., Infrared and Raman Spectra of Inorganic and Coordination Compounds, Part B, 5$^{th}$ Ed., Wiley, NY, 1997]) This means that EDTDAA does indeed act as a heterodonor ligand.

A study of Cu(II) complexes of EDTDAA was also conduced using the UV/Vis spectra to examine the stability of the complexes towards acids and the coordination of bromine anions with the complex. The successful ATRP of acidic monomers in aqueous media will require the transition metal complex to be reasonably stable towards acids and to accept the radically transferable atom or group, such as, bromine anions.

Figure 7:
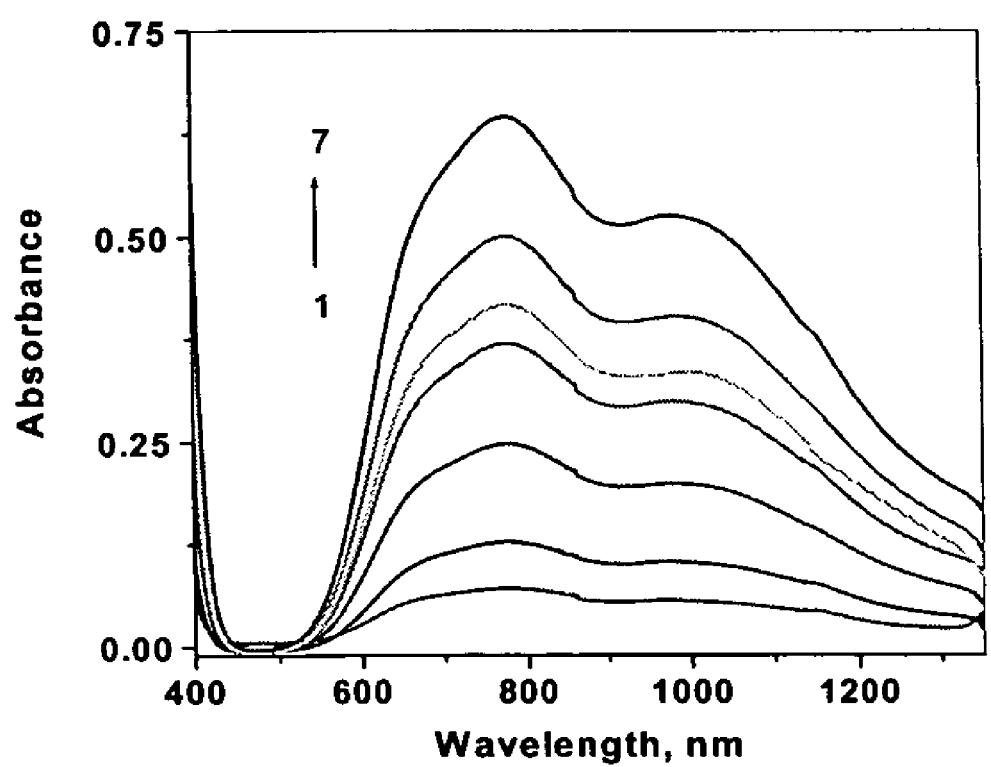
FIG. 7 illustrates UV/Vis spectra of Cu(II) EDTDAA complexes of various concentrations, the numbers at the curves indicate the number of equivalents of ligands added to the Cu(II)
Figure 8:
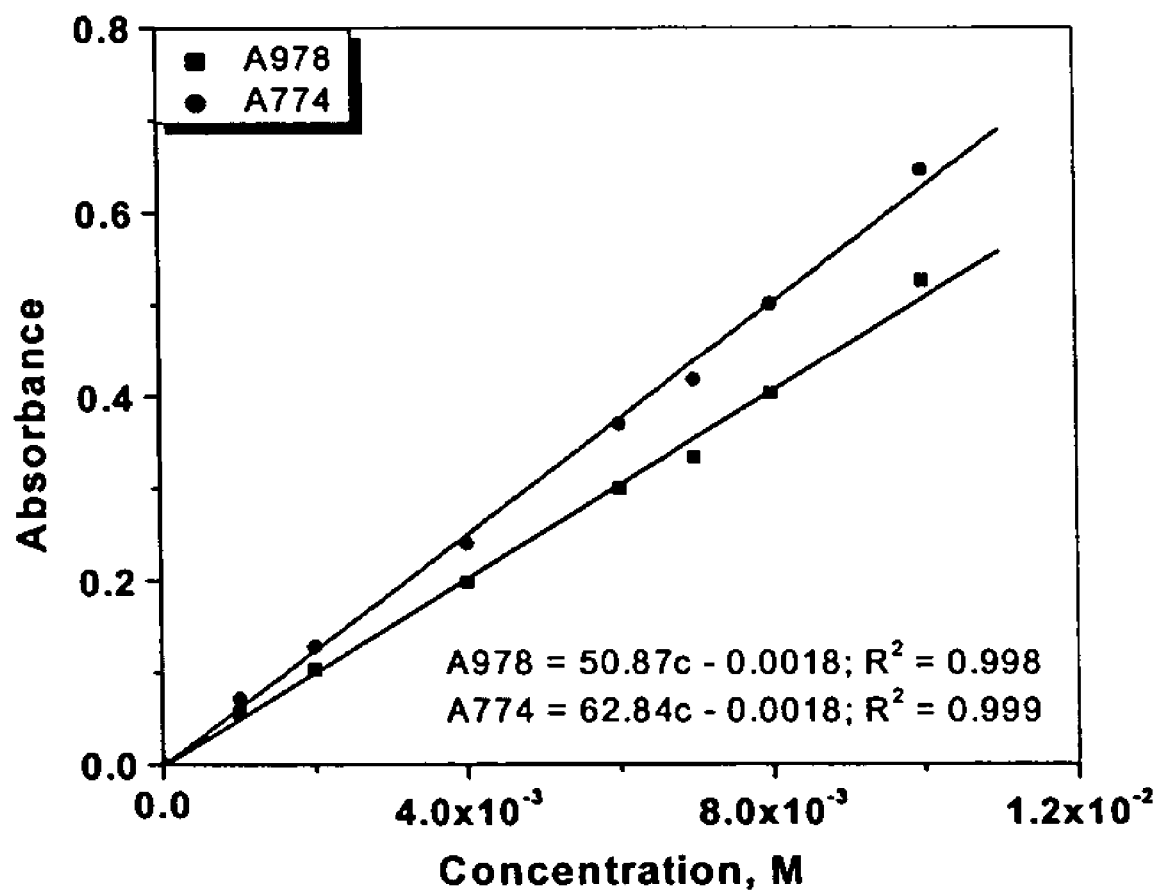
FIG. 8 illustrates calculation of extinction coefficients for Cu(II) EDTDAA complexes measure by UV/Vis spectra at two different wavelength (774 and 978 nm)

FIG. 7 shows the electronic spectra of a series of solutions of different concentrations of the Cu(II) complex of EDTDAA (prepared by mixing of solutions of CuSO$_4$ (to avoid complications by the presence of coordinating anions such as bromide) and Na$_2$EDTDA in 1:1 molar ratio). The extinction coefficients were determined (FIG. 8) to be $\epsilon_{978} = 50.9$ and $\epsilon_{774} = 62.8$ L mol$^{-1}$ cm$^{-1}$.

Figure 9:
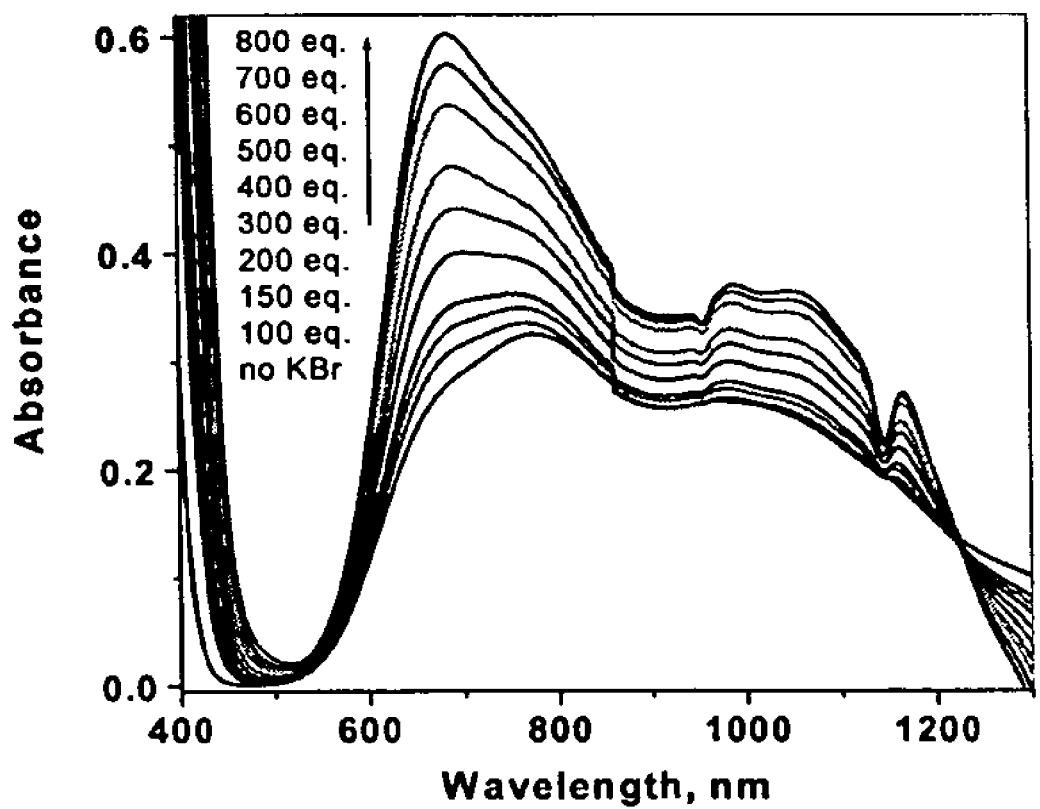
FIG. 9 illustrates UV/Vis spectra for a series of complexes with different concentrations of Br, from no KBr to 800 equivalents.

The procedure of Coleman may be used to determine whether the complex may coordinate with the bromide ions, [Coleman, J. S., Varga, L. P., Mastin, S. H., Inorg. Chem., 9(5), 1015-20 (1970)]. This procedure was applied in order to determine the number of different absorbing species in a series of solutions prepared by mixing of equal amounts of $CuSO_4$ and $Na_2EDTDAA$, containing different concentrations of $Bu_4NBr$. In this more detailed study aqueous 0.1 M solutions of $CuSO_4$ and $Na_2EDTDA$ were mixed with various amounts of KBr (100-800 equivalents to Cu(II)). The spectra of the series of solutions with different concentrations of bromide are shown in FIG. 9.

Figure 10:
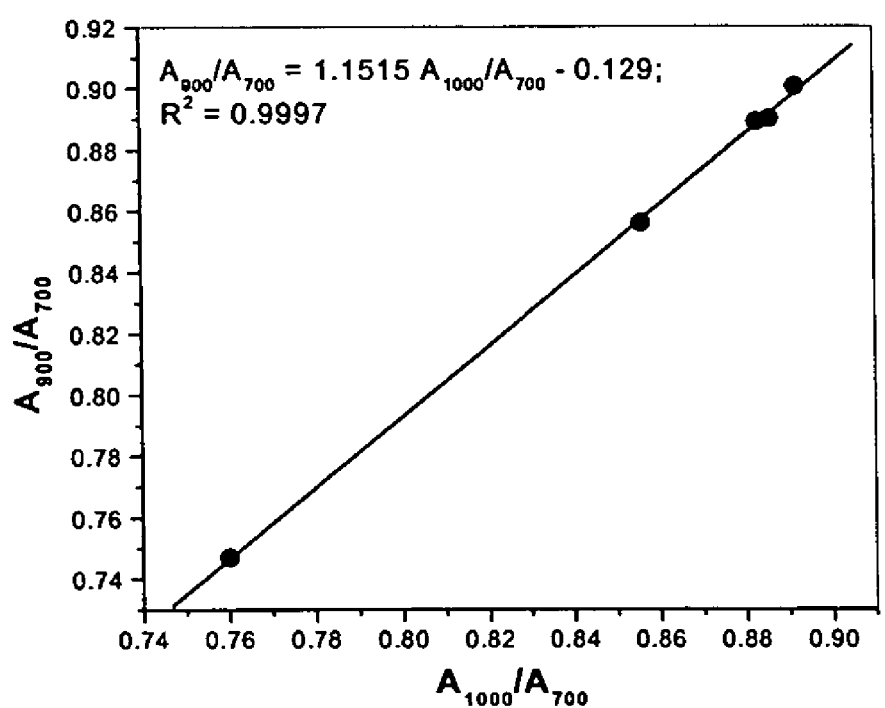
FIG. 10(a) illustrates ratio of absorption at different wavelengths taken from FIG. 9 above UV/Vis spectra and FIG. 10(b) illustrates detailed examination of ratio of absorption at different wavelengths taken from FIG. 9 between 400 and 1300 nm from UV/Vis is spectra of FIG. 10(a)
Figure 10:
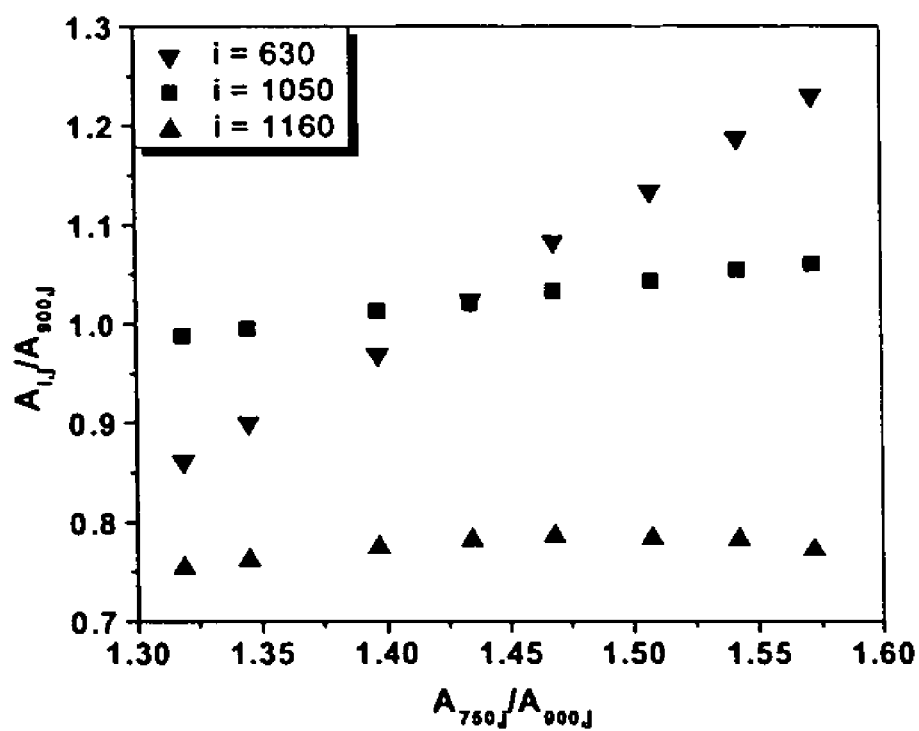

In order to determine the number of absorbing species, the plot shown in FIG. 10 was constructed. If the plot of the ratio of two different wavelengths ($\lambda_2/\lambda_1$) vs. the ratio of a third to the first wavelengths ($\lambda_3/\lambda_1$) is linear, this is an indication that two different species are present in the solution, i.e. the Cu(II) complex of EDTDAA without and with one coordinated bromide anion. As seen from FIG. 10, this is indeed appears to be the case. However, if a more detailed study is performed and the spectral analysis is performed at several different regions within 400 to 1300 nm bands, instead of obtaining a family of straight lines (which would be expected for two species), a set of lines of different slopes (and one higher order curve) and different intercepts were obtained, FIG. 10B. This shows that more than two absorbing species are present, which makes the determination of the stability of the Cu(II)—Br bond very complicated. The transition metal complexes may include; $[Cu^{II}(EDTDA)(H_2O)]$ (its existence was shown by IR spectroscopy), $[Cu^{II}(EDTDA)Br]^-$, and $[Cu^{II}(EDTDA)]$. However, polymeric structures with bridging EDTDA ligands may also be present.

In order to determine the equilibrium constant K of the formation of the bromide complex, i.e. of the following equilibrium:

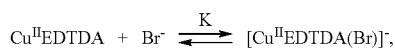

$$Cu^{II}EDTDA + Br^- \xrightleftharpoons{K} [Cu^{II}EDTDA(Br)]^-,$$

the absorbance at a certain wavelength of a solution in which the above equilibrium is shifted completely to the right should be determined [Beugelsdijk, T. J., Drago, R. S., J. Am. Chem. Soc., 97(22), 6466-72 (1975)]. However, the absorbance of the solution containing 0.75 M of bromide was used. This approach may introduce some error in the value of K, but can be used for qualitative evaluation of its value.

$$\frac{Kc_0}{x_i} = \frac{1}{(1-x_i)(n-x_i)}$$

In the above equation, n is the number of equivalents of added bromide (total $nc_0$) vs. the Cu(II) complex with no bromide ($c_0$) and $x_i=(A_0-A_{i,eq})/(A_0-A_\infty)$, where $A_0$ is the initial absorbance of the Cu(II) complex at $\lambda$max, $A_{i,eq}$ is the absorbance of the i-th solution after the equilibrium has been reached, and $A_\infty$ is the absorbance of a solution in which the equilibrium is totally shifted to the right. The plot of $1/(1-x)(n-x)$ vs. $1/x$ can be therefore used to determine K. The absorbances at 774 nm were used. The determined value for K is 0.94. It should be remembered that it is only an approximate value. It is also a conditional stability constant. For a solvent which cannot form complexes with Cu(II), the value of K should be about 235 times higher ($\beta_{Cu}$ taking into account the formation of a monoaqueous complex with stability constant of $\beta=4.17$ is equal to 235 for 56 M water). Therefore, an approximate value for K=220 (for solvents such as methanol) can be obtained from the current data.

A conclusion of these preliminary studies is that bromide indeed coordinates to the Cu(II) complex of EDTDAA, thus providing the deactivating species for ATRP.

The remaining question to be answered is whether the complexes are stable in acid solutions, since the pH of a solution of MAA in water is approximately 1.8. It is therefore necessary to make sure that the Cu(I) and Cu(II) complexes are stable at this pH. The electronic spectra of $7\times10^{-3}$ M solutions of the complex in water alone and in the presence of 0.005 M and 0.02 M p-toluenesulfonic acid (corresponding to pH 2.3 and 1.7, respectively) are presented in FIG. 11. A slight change in the electronic spectrum of the complex is observed at pH 2.3, and it becomes more significant in more acidic solution, pH 1.7. However, the shape of the spectrum does not change and therefore it can be concluded that the complexes have some stability even in highly acidic solutions (but about 40% of the complex is "lost" at pH 1.7). One way to avoid the decomposition of the complex in the presence of MAA is to use mixed methanol-water solvents as the acid would be significantly less dissociated. This approach would also help to avoid any hydrolysis of the bromine-terminated initiator throughout the polymerization.

As shown below in the examples section this series of spectral analysis allowed us to make an expedient efficient evaluation of the critical parameters required for identification of a potential catalyst for ATRP of acidic monomers in aqueous solution and thereby validated this approach to catalyst selection.

DISCUSSION OF EXAMPLES

The initial examples that were run on the controlled polymerization of methacrylic acid in water and water/methanol mixtures indicated an initial fast controlled polymerization that gradually slowed down with conversion. This was initially attributed to hydrolysis of the active chain end, the bromine group, and additional runs in the presence of additional methanol increased the time of "living" polymerization. One reason that this preliminary observation is being mentioned is that this is an expedient route to bromine free polymer in aqueous systems. Under acid conditions, a polymer with a terminal bromine, or other halogen groups may be heated in the presence of water resulting in the replacing the bromine with a hydroxy group. Under basic conditions the bromine is replaced by an alkene group (dehydrobromination). In this case, the resulting polyalkene may be used as a macromonomer.

A series of spectral analysis were conducted on transition metal complexes with heterodonor ligands to determine if the complexes met the criteria for conducting a controlled radical polymerization of acidic monomers in aqueous systems. The details of the analysis are provided and the analysis indicated a catalyst had been formed and successful examples of ATRP of methacrylic acid in water validated the concept and analysis.

The general utility of the catalyst for ATRP polymerization of other monomers, which would be required for formation of random, gradient or block copolymers was exemplified by controlled polymerization of hydroxyethyl methacrylate and the use of water soluble macroinitiators for the direct preparation of block copolymers comprising acidic functionality in one or more segments of the block copolymer.

We have therefore provided a series of formulae identifying the fundamental parameters that should be considered if one desires to move beyond empiricism in development of catalyst for various polymerization reactions. We demonstrate below how determination of the values identified as critical in the use of the transition metal complex as a catalyst provides an expedient route to efficiently identify a transition metal complex that allows one to conduct a polymerization hitherto impossible. We stated earlier that we believed that these tools will allow efficient evaluation of a multitude of catalyst complexes, comprising ligands, for a number of catalytic reactions including development of novel catalysts for a broad range of addition copolymerization reactions. Within this statement we included the belief that application of the tools discussed will allow the copolymerization of polar monomers into olefin copolymerization thereby providing an approach to functional polyethylene and polypropylene.

EXAMPLES

1. Determination of Critical Parameters of Heterodonor Ligand Complexes

1A. Determination of the Chemical Shifts and Stability of the Cu(I) Complexes of $Na_2EDTDAA$, which are to be used for the Aqueous ATRP of Acidic Monomers.

For this purpose, a series of three solutions were prepared. The solid ligand and CuBr were mixed in a NMR tube, which was then closed with a rubber septum. Vacuum was applied followed by filling the tube with nitrogen several times. Then, deuterated water, purged with nitrogen for 24 h was added, and the tube was sealed. After the CuBr dissolved, NMR spectra of the solutions were taken. The results are presented in Table 1. The two resonance peaks for ligand are observed at 3.38 and 2.96 ppm.

TABLE 1

| Solution | [CuBr], M | [$Na_2EDTDAA$], M | $\delta_{1,j}^{obs}$, ppm ($\delta_{1,j}^{obs} - \delta_1^L$) | $\delta_{2,j}^{obs}$, ppm ($\delta_{2,j}^{obs} - \delta_2^L$) |
|---|---|---|---|---|
| 1 | $9.76 \times 10^{-2}$ | 0.298 | 3.52 (0.14) | 3.13 (0.17) |
| 2 | $9.76 \times 10^{-2}$ | 0.199 | 3.58 (0.20) | 3.19 (0.23) |
| 3 | $9.76 \times 10^{-2}$ | 0.448 | 3.47 (0.09) | 3.06 (0.10) |

Figure 12:
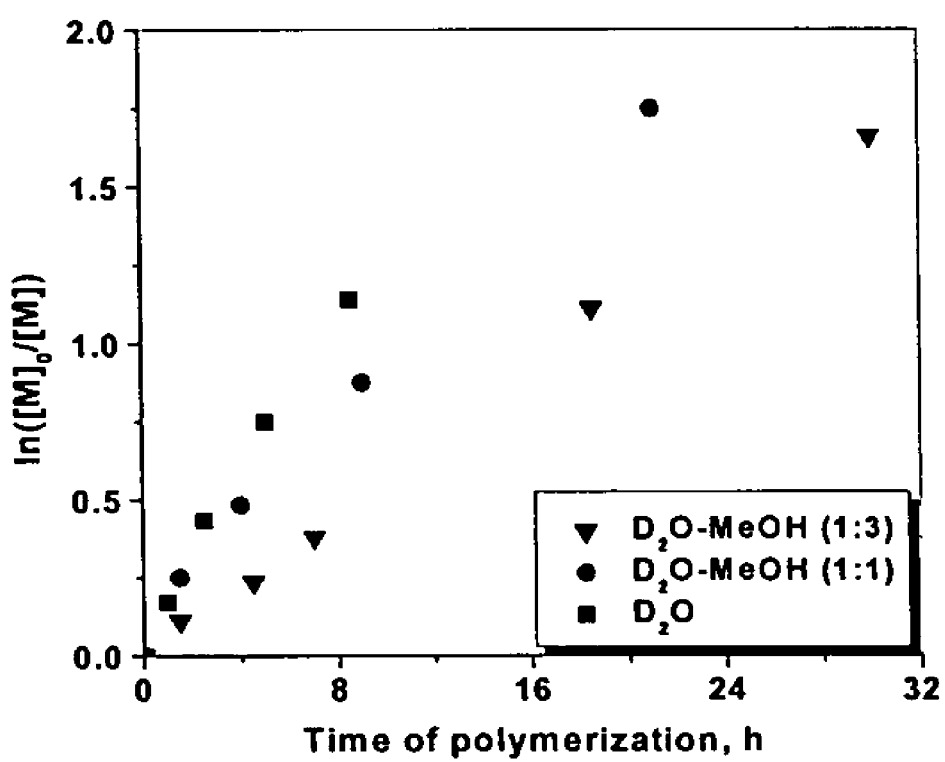
FIG. 12 illustrates the polymerization rate for MAA in different solvents using $CuBr/Na_2EDTDA$ as catalysts including two concentrations of $D_2O/MeOH$ and $D_2O$ alone.

The plot of $\delta_{i,j}^{obs} - \delta_i^L$ vs. $[M]_{0,j}/[L]_{0,j}$ is shown in FIG. 12. As seen, the intercepts are both very close to zero, as expected for a stable complex. The determined values for the chemical shifts of the complexed ligand from the slopes are $\delta_1^C = 3.78$ ppm and $\delta_2^C = 3.43$ ppm.

1B. IR Spectral Studies of Cu(II) Complexes of Ethylenedithiodiacetic Acid (EDTDAA).

The Cu(II) complexes of EDTDAA were studied by IR in order to determine the mode of coordination of the ligand, and by UV/Vis spectroscopy in order to study their stability.

Figure 6:
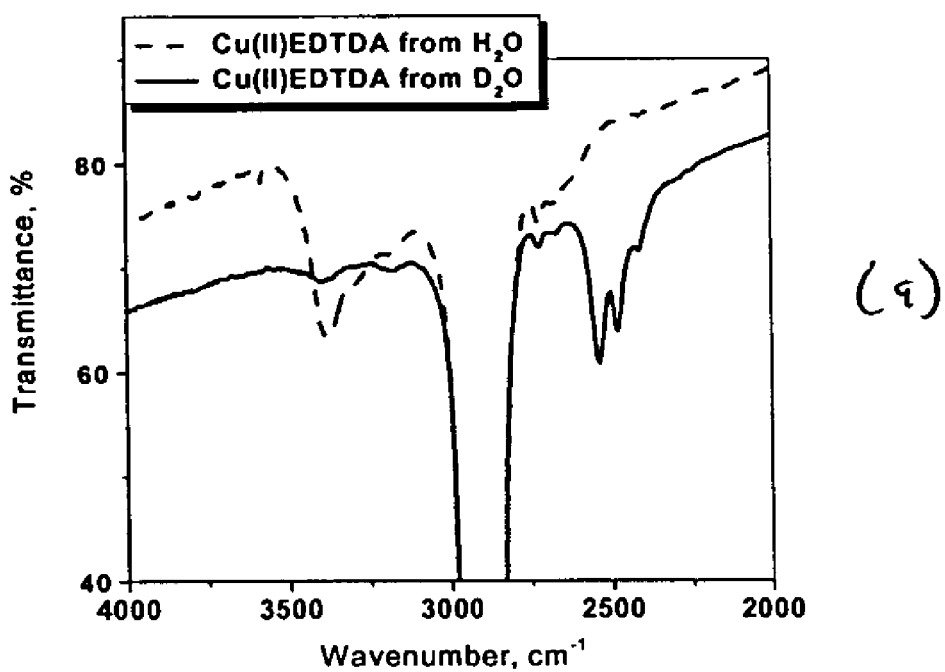
FIGS. 6(a) and 6(b) illustrates comparison of IR Spectra of Cu(II) EDTDA complexes with water and deuterium oxide.
Figure 6:
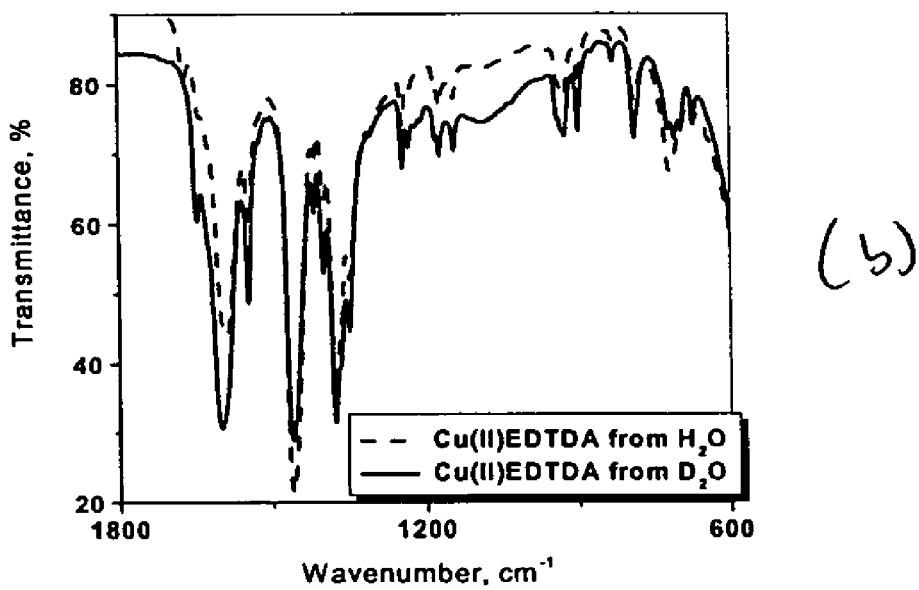

The Cu(II) complex of EDTDAA was synthesized in the following way: 0.447 g (0.002 mol) of $CuBr_2$ was dissolved in 50 ml of methanol. This solution was added with stirring to a solution of 0.508 g (0.002 mol) of $Na_2EDTDA$ in a mixture of 50 ml of methanol and 25 ml of water. A light bluish-green precipitate was formed and was filtered from the solution after 1 hour and was washed with water followed by methanol on the filter. It was dried and studied by IR spectroscopy. The spectra of $Na_2EDTDA$ and the Cu(II) complex were recorded in nujol mulls. They are shown in FIG. 6 and one can see that the complex is hydrated or the water molecule is coordinated to the copper ion. One can conclude that both the carboxylate oxygen and thioether sulfur atoms are involved in complex formation. (Note the shift of the vibration frequency of the CS bond upon coordination. The shape of the band corresponding to asymmetric COO vibration also changes upon coordination due to the change of symmetry ($C_{2v}$ in the ionic sodium salt to $C_s$ in the complex), indicating the participation of the carboxylate group in the complex-formation.

1C. Role of Water in Cu(II) Complexes of Ethylenedithiodiacetic Acid (EDTDAA) Complex The Cu(II) water complexes of EDTDAA were synthesized as follows. 0.005 M solutions of $CuSO_4$ and $Na_2EDTDA$ in water or deuterium oxide were mixed and the precipitated light green crystals were isolated, washed with water on the filter and dried in vacuum at 60-70° C. for 3-4 days. The spectra of the two Cu(II) complexes were recorded in nujol mulls. They are shown in FIG. 6. The presence of water (or deuterated water) is clearly seen in both spectra. From the position of the peaks (3379 and 3304 cm$^{-1}$ ($\Delta=75$ cm$^{-1}$) in the case of water, and 2538 and 2481 cm$^{-1}$ ($\Delta=57$ cm$^{-1}$) in the case of deuterium oxide) corresponding to the asymmetric and symmetric vibrations of OH (OD) bonds, one can conclude that water molecules are indeed coordinated. (Further evidence is that water cannot be removed by prolonged drying at relatively high temperatures in vacuum.) This study indicates that Cu(II) is penta-coordinated in its EDTDAA complexes. The water molecules can therefore be displaced by other ligands such as halide anions, thus generating the necessary deactivating species for ATRP.

1D. UV/Vis Studies of Cu(II) Complexes of EDTDAA

The spectra of the Cu(II) complexes in water were studied and FIG. 7 shows the electronic spectra of a series of solutions of the Cu(II) complex of EDTDAA (prepared by mixing of solutions of $CuSO_4$ (to avoid complications by the presence of coordinating anions such as bromide) and $Na_2EDTDA$ in 1:1 molar ratio). The lowest concentration (solution 1) was $1 \times 10^{-3}$ M and the highest (solution 7)–$1 \times 10^{-2}$ M. The most pronounced maxima are situated at 774 and 978 nm. The extinction coefficients at these wavelengths were determined (FIG. 8) to be $\epsilon_{978}=50.9$ and $\epsilon_{774}=62.8$ L mol$^{-1}$ cm$^{-1}$.

1E. Coordination of Bromide Ions to the Cu(II) Complex of EDTDAA

A series of solutions prepared by mixing of equal amounts of $CuSO_4$ and $Na_2EDTDAA$, containing different concentrations of $BU_4NBr$. The spectra of the series of solutions containing $7 \times 10^{-3}$ M of both Cu(II) and EDTDA$^{2-}$ and different concentrations of bromide ion were taken and examined.

Initially in order to determine the number of absorbing species, the plot shown in FIG. 10 was constructed. If the plot of the ratio of two different wavelengths ($\lambda_2/\lambda_1$) vs. the ratio of a third to the first wavelengths ($\lambda_3/\lambda_1$) is linear, this is an indication that two different species are present in the solution, i.e. the Cu(II) complex of EDTDAA without and with one coordinated bromide anion. As seen from FIG. 10, this is indeed appears to be the case.

1F. Detailed Examination of Coordination of Bromide Ions to the Cu(II) Complex of EDTDAA Aqueous 0.1 M solutions of $CuSO_4$ (not the bromide as above in 1D1) and $Na_2EDTDA$ were used as the stock solutions. 0.25 mL of these solutions were mixed with various amounts of KBr (100-800 equivalents to Cu(II)), and diluted to 5 mL (total of $2.5 \times 10^{-5}$ mol of both Cu(II) and the ligand were thus present in the solution).

The spectra of this series of solutions (different concentration of KBr) are shown in FIG. 9. Analysis for the number of absorbing species was carried out, as described above where the analysis for two absorbing species gave a straight line, but when the analysis was performed at several different wavelengths, instead of obtaining a family of straight lines (which would be expected for two species), a set of lines of different slopes (and one higher order curve) and different intercepts were obtained (FIG. 10B). This indicates that more than 2 species absorb in the studied spectral region.

1G. Stability of the Cu(II) Complex of EDTDAA Towards Acids.

The pH of a solution of MAA in water (1:1 by volume, i.e., 5.89 M) is approximately (assuming a $K_a$ value of $5 \times 10^{-5}$ for MAA) 1.8.

Figure 11:
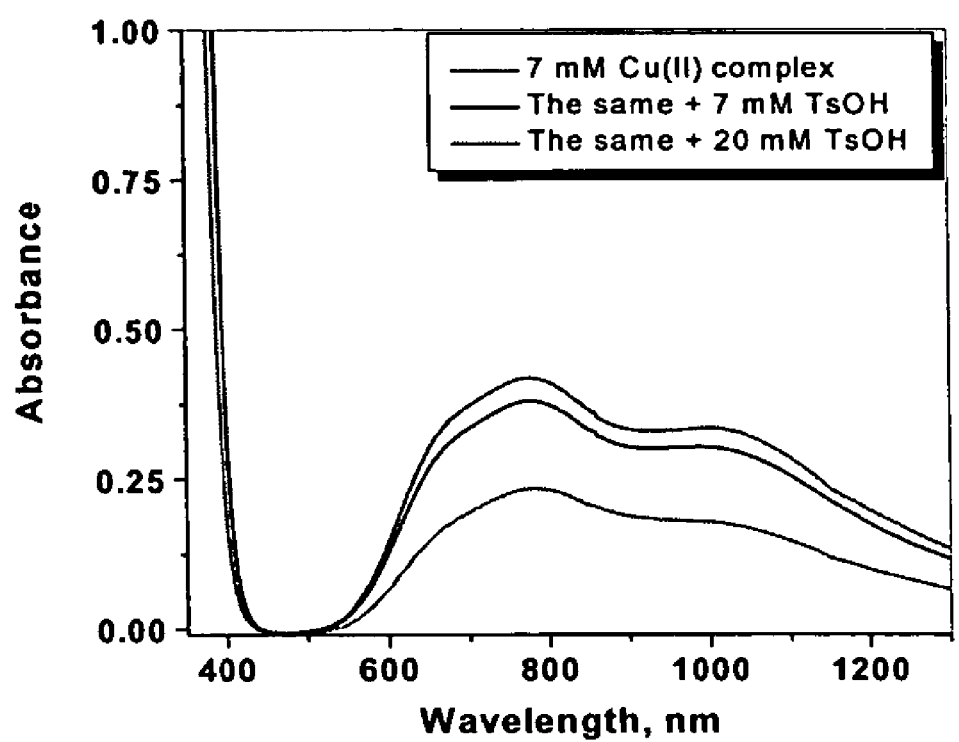
FIG. 11 illustrates the detailed coleman plots of FIG. 9 for a series of complexes with different concentrations of added p-toluenesulfonic acid.

The electronic spectra of $7 \times 10^{-3}$ M solutions of the complex in water alone and in the presence of 0.005 M and 0.02 M added p-toluenesulfonic acid (corresponding to pH 2.3 and 1.7, respectively) were taken and are presented in FIG. 11. The complex is therefore a suitable catalyst for an catalytic reaction in acidic media, for example, an ATRP.

2. Polymerization of Methacrylic Acid Using Bidentate Heterodonor Ligands to Complex Copper.

2A. Polymerization of Methacrylic Acid (MAA) at 35° C. in Methanol Using CuBr Methylthioacetic Acid Complex [CuBr(MTAA)$_2$] as the Catalyst (nvt-maa1)
Reagents: MAA—2 ml (2.03 g, 0.0236 mol)
  MeOH—2 ml (total)
  MTAA—120 µl (0.15 g, 1.416 mmol)
  CuBr—0.0677 g (0.472 mmol)
  MePEG(BiB) of MW=699 g/mol—280 µl (0.472 mmol)
  T=35° C.

The ligand, MTAA, was dissolved in 1 ml of methanol, and the mixture was degassed by 4 f-p-t cycles. CuBr was then added to the frozen mixture, the flask was closed with a rubber septum, evacuated and back-filled with nitrogen several times. The CuBr dissolves slowly but completely at these conditions. Separately, the monomer was dissolved in 1 ml of methanol and the solution was degassed by 4 f-p-t-cycles. The solution of the ligand was then added, the flask was immersed in a thermostatted bath at 35° C., and the degassed initiator was added. After 22 h, a sample was taken and mixed with excess of diethyl ether, but no significant polymerization was observed. Therefore, the polymerization was attempted again using pure water as the reaction medium (ATRP in water is significantly faster than in methanol) at higher temperature.

2B. Polymerization of MAA at 70° C. in Water Using CuBr(MTAA)$_2$ as the Catalyst (nvt-maa2)
Reagents: MAA—2 ml (2.03 g, 0.0236 mol)
  D$_2$O—2 ml (total)
  MTAA—120 µl (0.15 g, 1.416 mmol)
  CuBr—0.0677 g (0.472 mmol)
  MePEG(BiB) of MW=699 g/mol—280 µl (0.472 mmol)
  T=70° C.

Exactly the same procedure as in Example 2A was followed. This time, the reaction mixture became more viscous with time. It should be noted that after several hours, it was not completely homogeneous (polyMAA is not very soluble in water). Samples were taken at different times, mixed with D$_2$O, and neutralized with sodium carbonate. The solutions were analyzed by NMR and aqueous GPC. The results are presented in Table 2.

TABLE 2

| Sample | Time of pzn, h | Conversion (NMR) | $M_n$, g/mol* | PDI** |
|---|---|---|---|---|
| Maa2-1 | 15.5 | 0.352 | 13660 | 1.34 |
| Maa2-2 | 22.5 | 0.452 | 15870 | 1.46 |
| Maa2-3 | 39 | 0.752 | 19050 | 1.41 |

*PEO standards used for the calibration.
**Bimodal SEC traces. Both peaks move to higher molecular weights with conversion When this data is plotted the semi-logarithmic plot of conversion with time is linear and the molecular weights increase with conversion.

This is the very first example of successful ATRP of acidic monomer in aqueous solution.

3. Polymerization of Methacrylic Acid Using Tetradentate Heterodonor Ligands to Complex Copper.

3A. ATRP of Methacrylic Acid (MAA) in Aqueous Media Using Cu(I)/Na$_2$EDTDAA as the Catalyst: Kinetic Studies (nvt-maa3 and 4).

The purpose of these two experiments was to check if polymerization of MAA can occur when using the Cu Na$_2$EDTDAA complex, and to evaluate the rate of the reaction as a function of reaction temperature and solvent composition.

Flask1: 0.24 g (0.94 mmol) of Na$_2$EDTDAA in 1 ml of D$_2$O. The solution was degassed by 5 f-p-t cycles and 0.0677 g (0.472 mmol) CuBr was added to the frozen solution. The flask was closed, evacuated and back-filled with nitrogen several times. After warming up the flask, and mixing at room temperature a clear solution was slowly formed.

Flask2: 2 ml of MAA and 1 ml of D$_2$O (for experiment nvt-maa3) or 1 ml of MeOH-d4 (experiment nvt-maa4). The solution was degassed by 5 f-p-t cycles. The two solutions were mixed and the flasks immersed in a thermostated oil bath and 280 µl of MePEGBiB (targeted DP=75) was added. The kinetic results are summarized in Table 3 and when plotted show a linear increase in molecular weight with conversion.

TABLE 3

Kinetic results for the ATRP of MAA in the presence of CuBr/Na$_2$EDTDAA

| Experiment | Solvent | T, ° C. | Time, h | Conversion (NMR) |
|---|---|---|---|---|
| Maa3 | Water | 80 | 3 (very viscous) | 0.612 |
| Maa4 | Water-MeOH (1:1) | 60 | 3 | 0.165 |
|  |  |  | 4 | 0.206 |
|  |  |  | 5.5 | 0.293 |
|  |  |  | 8.5 | 0.374 |

The above results indicate that the ATRP of MAA can be carried out in aqueous media using CuBr/Na$_2$EDTDAA as the catalyst.

3B. ATRP of Methacrylic Acid (MAA) in Aqueous Media Using Cu(I)/Na$_2$EDTDAA as the Catalyst: Kinetic Studies (nvt-maa5).

The targeted DP of the polyMAA was changed to 100. The reaction was performed in water-methanol.

Flask1: 0.24 g (0.94 mmol) of Na$_2$EDTDAA in 2 ml of D$_2$O. The solution was degassed by 5 f-p-t cycles and 0.0678 g (0.472 mmol) CuBr was added over the frozen solution. The flask was closed, evacuated and back-filled with nitrogen several times. After warming up the flask, a clear solution was slowly formed.

Flask2: 4 ml of MAA and 2 ml of MeOH-d4. The solution was degassed by 5 f-p-t cycles.

The two solutions were mixed, the flask immersed in a thermostated oil bath at 60° C. and 250 µl of MePEGBiB was added. The results are summarized in Table 4.

TABLE 4

Kinetic results for the ATRP of MAA in the presence of CuBr/Na$_2$EDTDAA

| Sample | Time, h | Conversion |
|---|---|---|
| Maa5-5 | 10.5 | 0.377 |
| Maa5-6 | 20.5 | 0.488 |
| Maa5-7 | 45 (green solution) | 0.593 |

The polymers were analyzed by GPC using two independent techniques: directly, using aqueous GPC, and after conversion to polyMMA (by methylation by MeI in the presence of DBU; see example 5), using GPC as THF or DMF as the eluent. The latter approach should give more precise values of the degree of polymerization since polyMMA standards are available for calibration.

3C. ATRP of MAA in Aqueous Media (Water-Methanol=1:3) Using Cu(I)/Na$_2$EDTDAA as the Catalyst (nvt-maa10).

In the initial series of examples, including the examples detailed above, typically the semi-logarithmic plots for the ATRP of MAA in aqueous systems using the complex Cu(I)/Na$_2$EDTDAA as the catalyst were curved and this was attributed to hydrolysis of the alkyl bromide chain ends throughout the reaction. Therefore, in this series of examples the concentration of water was decreased when compared to the earlier reactions.

Flask1: 0.2391 g (0.94 mmol) of Na$_2$EDTDAA in 1 ml of D$_2$O and 1 ml of MeOH-d$_4$. The solution was degassed by 5 f-p-t cycles and 0.0675 g (0.472 mmol) CuBr was added over the frozen solution. The flask was closed, evacuated and back-filled with nitrogen several times. After warming up the flask, a clear solution was slowly formed.

Flask2: 4 ml of MAA (4.06 g, 0.047 mol) and 2 ml of MeOH-d$_4$. The solution was degassed by 5 f-p-t cycles. The solution in flask 2 was added to the first one. Slowly, a heterogeneous white mixture was formed (presumably, due to the insufficient solubility of the complex in the methanol-rich solvent). The reaction flask then immersed in a thermostated oil bath at 75° C. and 250 µl of MePEGBiB was added. The kinetics of the reaction were followed by NMR. The results are summarized below.

Experiment nvt-maa10

| Sample | Time, h | Conversion |
|---|---|---|
| Maa10-1 | 1.5 | 0.106 |
| Maa10-2 | 4.5 | 0.211 |
| Maa10-3 | 7 | 0.315 |
| Maa10-4 | 18.5 (very viscous) | 0.671 |
| Maa10-5 | 30 | 0.810 |

*0.2 M NaNO$_3$ in water as the eluent, PEO standards

The kinetic results are presented in FIG. 12. As seen, the semi-logarithmic kinetic plot (in contrast to the previously reported ones) is linear, and the polymerization reaches relatively high conversions. This was in accordance with the assumption about hydrolysis of the polymer chain ends in the presence of higher water concentrations in the first experiments however this reaction (as well as the following ones) was performed using freshly distilled MAA, which could be another reason for the different behavior.

3D. ATRP of MAA in Aqueous Media (Water-Methanol=1:1) Using Cu(I)/Na$_2$EDTDAA as the Catalyst (nvt-maa11).

Flask1: 0.2395 g (0.94 mmol) of Na$_2$EDTDAA in 2 ml of D$_2$O. The solution was degassed by 5 f-p-t cycles and 0.0672 g (0.472 mmol) CuBr was added over the frozen solution. The flask was closed, evacuated and back-filled with nitrogen several times. After warming up the flask, a clear solution was formed.

Flask2: 4 ml of MAA (4.06 g, 0.047 mol) was dissolved in 2 ml of MeOH-d$_4$. The solution was degassed by 5 f-p-t cycles. The solution in flask 2 was added to the first one, and as in the previous reaction, a heterogeneous solution was formed. The flask was immersed in a thermostated oil bath at 75° C. and 250 µl of MePEGBiB was added. The results are summarized in below.

| Sample | Time, h | Conversion | M$_n$, g/mol* | PDI* |
|---|---|---|---|---|
| Maa11-1 | 1.5 | 0.221 | — | — |
| Maa11-2 | 4 | 0.383 | 10920 | 1.28 |
| Maa11-3 | 9 | 0.583 | 15440 | 1.33 |
| Maa11-4 | 21 | 0.826 | 17600 | 1.41 |

*0.2 M NaNO$_3$ in water as the eluent, PEO standards

Surprisingly, the semilogarithmic kinetic plot (FIG. 12) was still linear (although the water concentration was higher than in the previous case). As in other aqueous ATRP reactions (but in contrast to the observations reported above, in which limits on conversion were observed), with increasing water concentration, the reaction became faster. The molecular weights increased with conversion in linear fashion, and the polydispersity remained low up to high conversions.

3E. ATRP of MAA in Pure Aqueous Media Using Cu(I)/Na$_2$EDTDAA as the Catalyst (nvt-maa12).

This reaction was also performed in pure water in order to determine the importance of the potential hydrolysis reaction, which was assumed to take place based on the earlier results reported above.

Flask1: 0.2390 g (0.94 mmol) of Na$_2$EDTDAA in 2 ml of D$_2$O. The solution was degassed by 5 f-p-t cycles and 0.0671 g (0.472 mmol) CuBr was added over the frozen solution. The flask was closed, evacuated and back-filled with nitrogen several times. After warming up the flask, a clear solution was slowly formed.

Flask2: 4 ml of MAA (4.06 g, 0.047 mol) and 2 ml of D$_2$O. The emulsion was degassed by 5 f-p-t cycles. The emulsion in flask 2 was added to the first one. Slowly, a heterogeneous white mixture was formed (most probably, due to the insolubility of MAA in pure water rather than due to precipitation of the complex). The reaction flask immersed in a thermostated oil bath at 75° C. and 250 µl of MePEGBiB was added. The results are given below.

Experiment nvt-maa12

| Sample | Time, h | Conversion |
|--------|---------|------------|
| Maa12-1 | 1 | 0.157 |
| Maa12-2 | 2.5 | 0.352 |
| Maa12-3 | 5 | 0.527 |
| Maa12-4 | 8.5 | 0.680 |

The kinetic results are also presented in FIG. 12. Again, a linear semilogarithmic plot was obtained. It seems that the previous results (limited conversions, decrease of reaction rate with increase of water concentration) were due to some impurity in the MAA used in the experiments (all the new results were obtained using freshly distilled MAA). These three reactions follow the trends observed generally for other ATRP reactions in aqueous solution. Molecular weights will be determined and reported later.

3F. ATRP of MAA from a Water Soluble Macroinitiaor Using CuBr/Na$_2$EDTDA as the Catalyst (nvt-maa13)

This reaction was performed in order to compare the results with the previous ones, and also—to determine molecular weights of the obtained polymers by NMR (after washing the polymer with THF in order to remove any unreacted macroinitiator potentially present in the system), as well as to analyze them by GPC after conversion to polyMMA. In addition a simpler experimental setup was used this time.
Reactants:
Na$_2$EDTDA—0.2395 g
D$_2$O—2 mL, methanol-d4—2 mL
MAA—4 mL
CuBr—0.0672 g
MePEOBiB of MW=699 g/mol—250 µL (targeted DP=100)
T=75° C.

The ligand was dissolved in the mixture of solvents and the monomer and the formed solution was degassed by 5 fpt cycles. CuBr was then added to the frozen mixture, and the flask was closed and filled with nitrogen. A clear colorless solution was formed. The flask was immersed in the oil bath and the system immediately became heterogeneous. The macroinitiator was then injected. Samples were taken to follow the reaction kinetics; part of each sample was neutralized with anhydrous Na$_2$CO$_3$ in deuterated water, and another part was kept for conversion of the polymer to polyMMA (after reaction with trimethylsilyldiazomethane) for GPC analysis against known standards.

Conversion was determined by NMR. The neutralized samples were dried in a vacuum oven, washed 5-6 times with THF to remove any trace unreacted initiator then redissolved in deuterated water. The deree of polymerization (DP) was determined by NMR using the signals of the methylene protons from PEO as an internal standard. The polyMAA samples were converted to the methyl ester by reaction with TMSCH$_2$N$_2$ in methanol-THF. The results are summarized in Table 5.

TABLE 5

| Sample | Time, h | Conv. (NMR) | DP (NMR) |
|--------|---------|-------------|----------|
| 1 | 1.75 | 0.226 | 42.8 |
| 2 | 3.25 | 0.304 | 46.7 |
| 3 | 5.75 | 0.480 | 58.3 |
| 4 | 8.5 | 0.561 | 68.7 |
| 5 | 10.75 | 0.602 | 73.9 |
| 6 | 20.75 | 0.741 | 88.1 |

Figure 13:
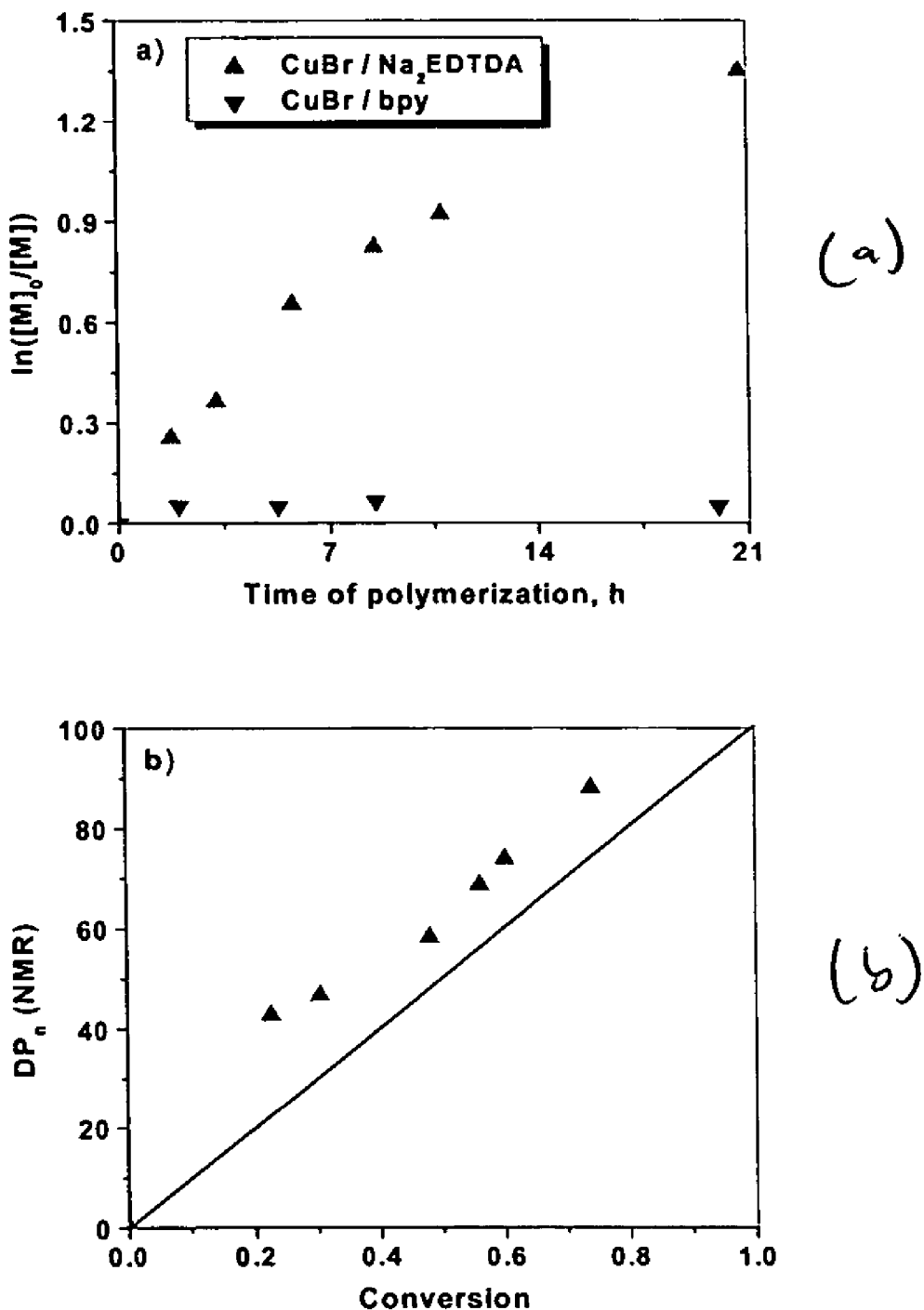

An increase of DP with conversion was observed, which in addition to the linear semilogarithmic kinetic plot (FIG. 13) can be used to ascertain the living nature of the polymerization. FIG. 13*b* indicates inefficient initiation, but the DP values are close to the theoretical. The values of Mn and PDI have to be determined before final conclusions are made.

4. COMPARATIVE EXAMPLES

4A. ATRP of MAA in Aqueous Media (Water-Methanol=3:1) Using Cu(I)/bpy as the Catalyst (2:1 to Initiator) (nvt-maa9).

It is usually assumed that Cu/bpy complex cannot be used as the catalyst for the ATRP of acidic monomers due to protonation. It was important however to prove this, and show the utility of sulfur-oxygen-based ligands for the purpose. The reaction was performed using high concentration of the catalyst (as in the experiment maa8a). If no polymerization is observed even at these conditions, the concept that the active complex is destroyed in acidic media could be proved.

Flask1: 0.2935 g (1.88 mmol) of bpy in 3 ml of D$_2$O. The solution was degassed by 5 f-p-t cycles and 0.1348 g (0.944 mmol) CuBr was added over the frozen solution. The flask was closed, evacuated and back-filled with nitrogen several times. After warming up the flask, a heterogeneous dark brown mixture was formed.

Flask2: 4 ml of MAA (4.06 g, 0.047 mol) was dissolved in 1 ml of MeOH-d4. The solution was degassed by 5 f-p-t cycles.

The solution in flask 2 was added to the first one. A homogeneous solution was formed (i.e., the catalyst completely dissolved). However, no change in color was observed. The reaction flask immersed in a thermostated oil bath at 75° C. and 250 µl of MePEGBiB was added. Again, no color change could be seen. The results are presented in Table 6.

TABLE 6

Experiment nvt-maa9

| Sample | Time, h | Conversion |
|--------|---------|------------|
| Maa9-1 | 3.5 | 0.055 |
| Maa9-2 | 19 | 0.065 |
| Maa9-3 | 43 | 0.089 |

Figure 14:
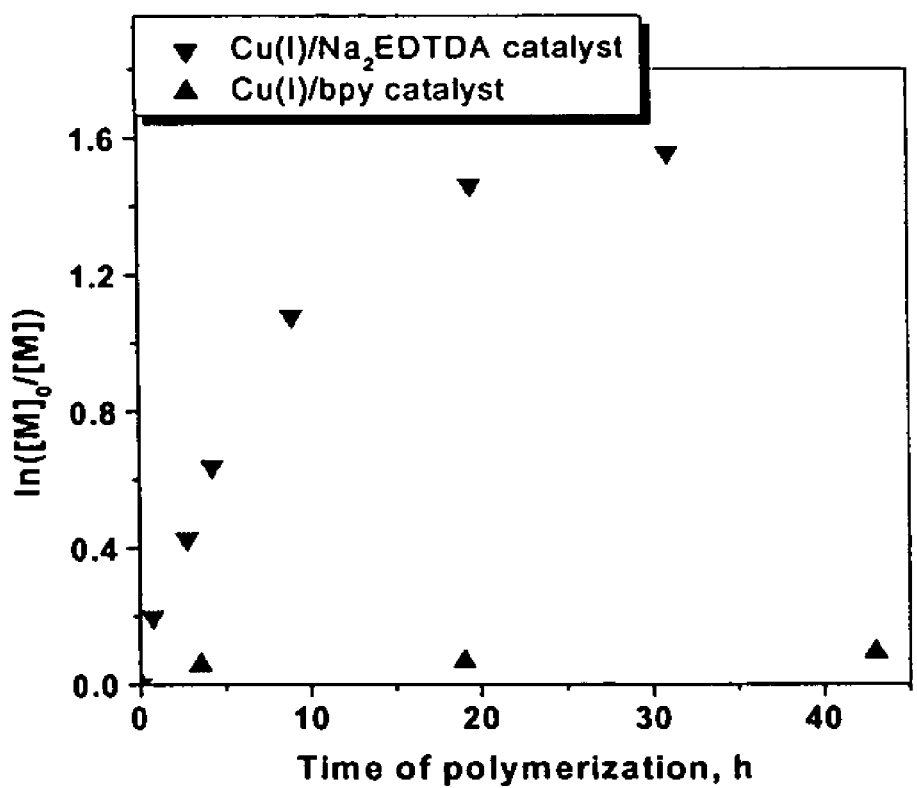
FIG. 14 illustrates comparison of heterodonor ligand complexes and Cu(I)bpy catalyst complex for polymerization of MAA in water.

The results presented above clearly show that indeed Cu/bpy complexes cannot be used as the ATRP catalysts for acidic monomers and prove the importance of the S, O-based ligands. The kinetic results of this experiment and the similar nvt-maa8a (same concentrations of reagents, but different catalyst) are compared in FIG. 14.

4B. ATRP of MAA Using CuBr/bpy as the Catalyst (nvt-maa14)

The reaction was performed using CuBr/bpy as the catalyst in order to comapre the results with the ones from the previous experiment 3F.(nvt-maa13)

bpy—0.1463 g
$D_2O$—2 mL, methanol-d4—2 mL
MAA—4 mL
CuBr—0.0672 g
MePEOBiB of MW=699 g/mol—250 µL (targeted DP=100)
T=75° C.

Bpy was dissolved in the mixture of solvents and the monomer. All other procedures were done as in 3F (nvt-maa13). The conversion reached about 5% in 2 hours and than the catalyst was completely deactivated and the reaction stopped. The kinetic results, along with those from experiment 3F are presented in FIG. 13a.

4C. ATRP of MAA Using CuBr/bpy as the Catalyst in DMF as the Solvent (nvt-maa14)

Methacrylic acid can significantly protonate the bpy ligand. (For example, only the protonation reaction in the presence of 1M acid can lead to a decrease of the stability of the complex by 3-4 orders of magnitude.) In addition, there is strong evidence that MAA can coordinate to Cu(I), significantly stabilizing this state of the catalyst, and, therefore, making it inactive for activation. As it was discussed earlier, one way to polymerize acidic monomers by ATRP is to find ligands which are not basic, coordinate to both Cu(I) and Cu(II), giving soluble complexes with the appropriate electrode potential and halogen philicity of the Cu(II) complex. Another approach is to find a solvent in which all reaction components are soluble, and in which the acidity of MAA is lower than in water (or basicity of bpy is lower than in water). One potential candidate was DMF. The reaction was performed using 2 ml of MAA and 2 ml of DMF. After degassing, a mixture of 0.0677 g (0472 mmol) of CuBr and 0.369 g (2.36 mmol, 5 eq. vs. Cu(I)) of bpy was added. The mixture was heated to 70° C. and mePEGBiB was added (125 µl; targeted DP—100). The reaction mixture stayed brown but no polymerization took place (0% conversion in 5 h). This indicates that perhaps MAA deactivates (both by protonation of bpy and coordination to Cu) the ATRP catalyst in DMF. The same behavior was previously observed in pure water.

5. Analysis

Figure 15:
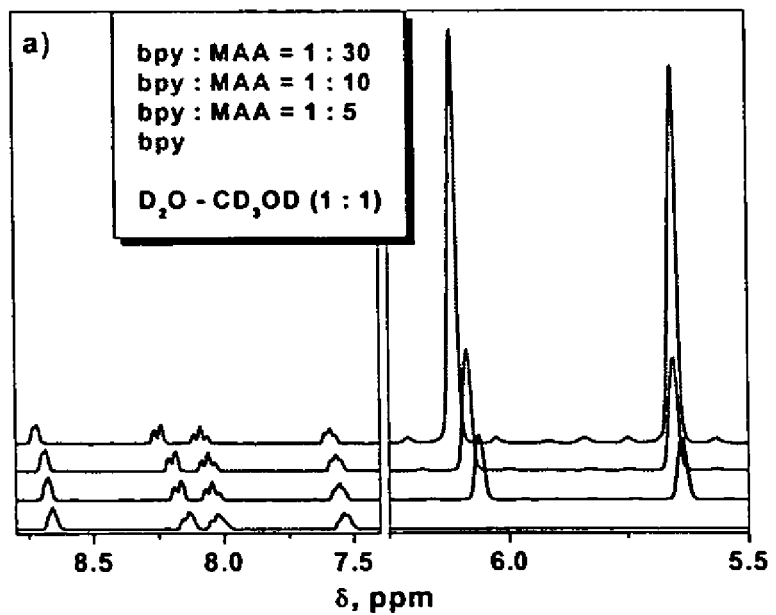
FIG. 15(a) illustrates NMR spectra indicating protonation of bpy by MAA in water-methanol and FIG. 15(b) illustrates the decomposition of $Cu(bpy)_2Br$ in the presence of MAA.
Figure 15:
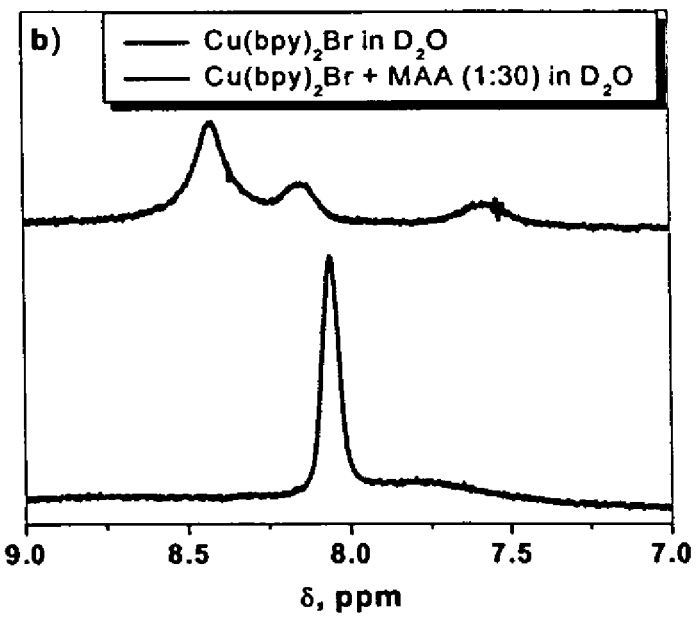

5A. NMR Studies on Complex Formation of MAA with $[Cu^I(bpy)_2]Br$ and the Protonation of bpy by MAA It is typically assumed that bpy-based ATRP catalysts cannot work with acidic monomers due to protonation of the basic nitrogen-containing ligand and/or coordination of MAA to the copper center, changing its redox potential (the complex formed is more oxidizing than the starting bpy-complex; see below). In fact, both reactions take place, although, judging from the brown color of the solution, bpy is at least partially coordinated to copper. NMR studies were performed to establish if protonation of bpy could take place at conditions (solvents and concentrations) used in ATRP. As seen from the gradual shift of the signal of aromatic protons from bpy as the amount of added MAA increases (FIG. 15a), protonation reaction could be ascertained to take place. This protonation is expected to decrease the stability of CuBr/bpy complex by a factor of ca. 1000, depending on the concentration of MAA. The "decomposition" of the ATRP bpy-based activator in the presence of even only 30 equivalents of MAA could also be observed by NMR (FIG. 15b). More detailed electrochemical measurements are necessary these results provide for the first time proof of the assumed MAA coordination to copper in the bpy complexes.

6. ATRP of HEMA in Aqueous Media Using CuBr/$Na_2EDTDA$ as the Catalyst at 60° C. (nvt-HEMA-S-2)

Hydroxyethyl methacrylate (HEMA) was selected as a different water soluble monomer to confirm the utility of the new CuBr/$Na_2EDTDA$ catalyst as a robust system for controlled polymerization of polar monomers in water.

6A. Activation of an ATRP Initiator.

The initial experiment was conducted in order to determine if the catalyst complex is capable of activating the 2-bromoester initiator.

HEMA—3 ml
CuBr—0.0359 g ($3.6 \times 10^{-4}$ mol)
$Na_2EDTDA$—0.1828 g ($7.2 \times 10^{-4}$ mol)
MePEGBiB—135 1 (targeted DP=100)
$H_2O$—1.5 ml, MeOH—1.5 ml, and DMF (standard for GC)—0.5 ml, T=60° C.

The monomer, water, methanol, DMF and the ligand were mixed in a Schlenk tube, and the solution (clear solution was obtained after slight heating and stirring) was degassed by 5 f-p-t cycles. After freezing the solution, CuBr was added, and the flask was evacuated and back-filled with nitrogen. After CuBr had completely dissolved (slowly) at 60° C., the initiator was added to the solution. The results are shown in Table 7.

TABLE 7

| # | Time, min | Conv. (GC) | $M_n \times 10^{-4}$, g/mol | PDI |
|---|---|---|---|---|
| 1 | 30 (viscous) | 0.377 | 10.96 | 3.32 |
| 2 | 45 | 0.474 | 9.73 | 4.01 |
| 3 | 65 | 0.622 | 10.12 | 4.09 |
| 4 | 90 | 0.713 | 8.43 | 5.24 |

The results show that although less active than the bpy complex, CuBr/$Na_2EDTDA$ the catalyst does undergo a redox reaction to initiate polymerization of HEMA. As expected, no control over the polymerization was observed since the deactivator can undergo hydrolysis. In order to get a controlled process, deactivator should be added to the catalyst. Another approach would be to add extra halide salt (such as KBr) in order to suppress the hydrolysis of the deactivating complex.

6B. ATRP of HEMA in Aqueous Medium Using CuBr/$Na_2EDTDA$ as the Catalyst at 60° C. (nvt-HEMA-S-5)

The same conditions as in the previous experiment were used, but 60% of Cu(II) was added as a component of the catalyst in order to achieve a controlled process.

HEMA—3 ml
CuBr—0.0144 g
$CuBr_2$—0.0334 g (60% of the total Cu)
$Na_2EDTDA$—0.1828 g ($7.2 \times 10^{-4}$ mol)
MePEGBiB—1351 (targeted DP=100)
$H_2O$—1.5 ml, MeOH—1.5 ml, and DMF (standard for GC)—0.5 ml, T=60° C.

The monomer, water, methanol, DMF and the ligand were mixed in a Schlenk tube, and the solution (clear solution was obtained after slight heating and stirring) was degassed by 5 f-p-t cycles. After freezing the solution, CuBr was added, and the flask was evacuated and back-filled with nitrogen. After CuBr had completely dissolved (slowly) at 60° C., the initiator was added to the solution. The results are shown in Table 8.

TABLE 8

| # | Time, min | Conv. (GC) | $M_n \times 10^{-4}$, g/mol | PDI |
|---|---|---|---|---|
| 1 | 90 | 0.144 | 1.23 | 1.76 |
| 2 | 180 | 0.291 | 1.38 | 1.93 |
| 3 | 285 | 0.52 | 2.42 | 2.82 |

The results show, as expected, that control was improved by adding extra deactivator to the reaction and indeed MW increases with conversion. In addition, MWs are siginificantly lower than in the previous case. The rather large polydispersities for a controlled system are due to chain-end hydrolysis. In order to increase the rate of polymerization vs. halogen-chain-end loss, one can increase the amount of catalyst.

6C. ATRP of HEMA in Aqueous Medium Using CuBr/ Na$_2$EDTDA with 60% of Cu(II) as the Catalyst at 60° C. (nvt-HEMAS-8)
HEMA—3 ml
CuBr—0.0142 g (40% of the total Cu)
CuBr$_2$—0.0331 g
Na$_2$EDTDA—0.1828 g
MePEGBiB of MW=699 g/mol—130 µl (targeted DP=100)
H$_2$O—2 ml, MeOH—1 ml, and DMF (standard for GC)— 0.5 ml, T=60° C.

This experiment was performed in order to complete the study of the O,S-based ligand for the ATRP of water soluble neutral monomers. In a Schlenk flask, the monomer, water, methanol, DMF and the ligand were mixed, and the solution (Na$_2$EDTDA dissolves slowly but completely) was degassed by 5 f-p-t cycles. After freezing the solution, the copper salts were added, and the flask was evacuated and back-filled with nitrogen. The mixture was not homogeneous. The reaction mixture was kept at 60° C. for 10 minutes. Finally, the initiator was added to the solution. The results are shown in Table 9.

TABLE 9

| # | Time, h | Conv. (GC) | $M_n \times 10^3$, g/mol | PDI |
|---|---|---|---|---|
| 1 | 0.5 | 0.022 | — | — |
| 2 | 1 | 0.009 | — | — |
| 3 | 2 | 0.022 | 6.22 | 1.31 |
| 4 | 3.75 | 0.064 | 11.17 | 1.48 |
| 5 | 7.5 | 0.364 | 24.1 | 2.29 |
| 6 | 8.5 | 0.446 | 24.9 | 2.33 |
| 7 | 19.75 | 0.864 | 25.9 | 2.61 |

Figure 16:
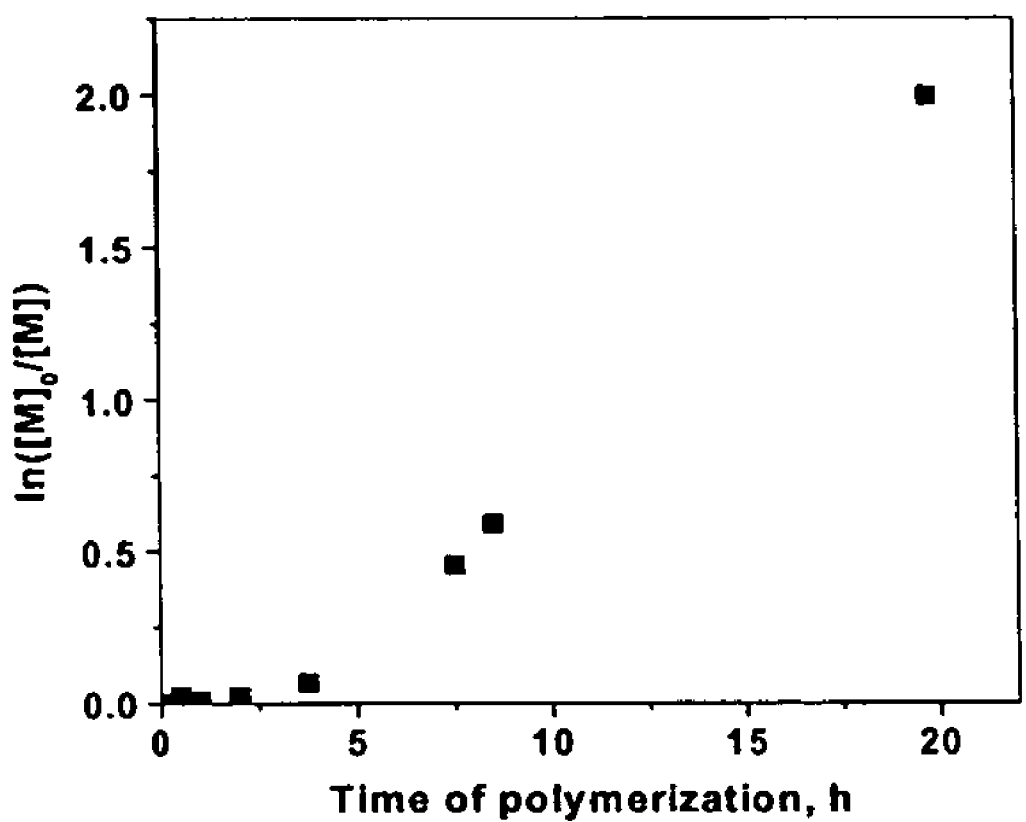
FIG. 16 illustrates HEMA polymerization using EDT-DAA-based catalyst (60% deactivator) at 60° C.
Figure 17:
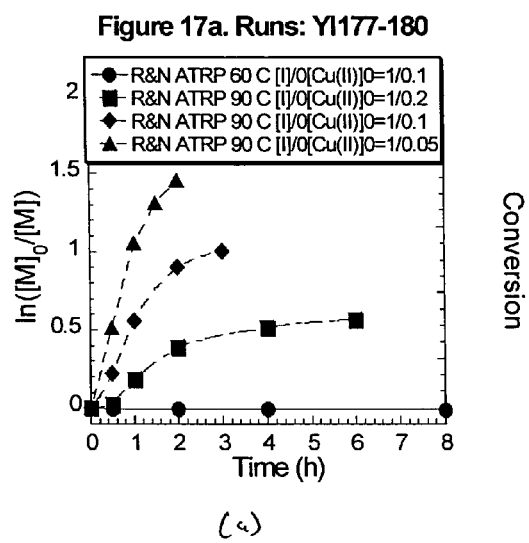
Figure 17:
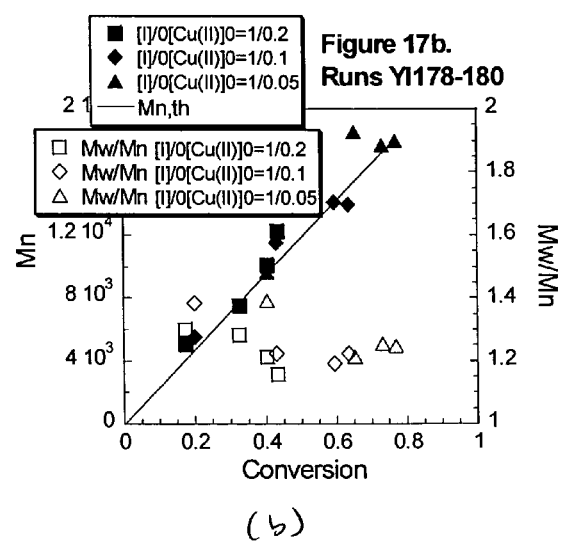

The reaction was slow and an induction period was observed, after which the kinetic semilogarithmic plot becomes linear (FIG. 16). In ca. 3.5 h, the solution became clear, which approximately coincides with the length of the induction period. The molecular weights increase with conversion and the polydispersity is lower than in the case when no deactivator had been added.

These examples demonstrate that a suitable catalyst complex can be selected through use of the mathematical and analytical tools described herein to allow the direct polymerization of ionic and neutral water soluble monomers in aqueous solution.

It will be understood that the present description illustrates those aspects of the invention relevant to a clear understanding of the invention. Certain aspects of the invention that would be apparent to those of ordinary skill in the art and that, therefore, would not facilitate a better understanding of the invention have not been presented in order to simplify the present description. Although embodiments of the present invention have been described, one of ordinary skill in the art will, upon considering the foregoing description, recognize that many modifications and variations of the invention may be employed. All such variations and modifications of the invention are intended to be covered by the foregoing description and the following claims.

We claim:

1. A catalytic polymerization process, comprising:
reacting free radically (co)polymerizable acidic monomers utilizing a transition metal complex as a catalyst, wherein the transition metal complex has sufficient solubility, a redox potential of less than 500 mV, acidity constants of the protonated ligand greater than $10^{-4}$, conditional disproportionation constant less than 1000, and conditional metal-radically transferable atom or group phylicity of greater than 10, and wherein the polymerization has a conversion of acidic monomers of greater than 13%.

2. The process of claim 1, wherein the transition metal complex comprises a suitable heterodonor ligand.

3. The process of claim 2, wherein the heterodonor ligand is a bidentate or a multidentate ligand.

4. The process of claim 3, wherein the heterodonor ligand comprises at least two donor atoms each independently selected from the group consisting of oxygen, sulfur, selenium, tellurium, nitrogen, phosphorus, arsenic, antimony, and bismuth.

5. The process of claim 2, wherein the heterodonor ligand comprises a donor atom that cannot be protonated more than 90% at the pH value of the reaction mixture.

6. The process of claim 4, wherein ligand comprises a sulfur atom.

7. The process of claim 5, wherein the heterodonor ligand comprises a sulfur atom and at least one oxygen atom.

8. The process of claim 2, wherein the ligand comprises a charged species.

9. The process of claim 8, wherein the charged species is a phenoxide or a carboxylate.

10. The process of claim 1, wherein the catalytic process is conducted in a polar media.

11. The process of claim 10, wherein the polar media comprises at least one of water and an alcohol.

12. The process of claim 11, wherein the alcohol is at least one of methanol, ethanol, and propanol.

13. The process of claim 1, wherein the catalytic reaction is an atom transfer radical polymerization process.

14. The process of claim 13, wherein the atom transfer radical polymerization is conducted in a polar medium.

15. The process of claim 14, wherein the polar medium comprises at least one of water, and alcohols.

16. The process of claim 1, wherein the catalyst has sufficient stability towards ionic species and conditional radically transferable atom phylicity to act as a catalyst in the reaction media.

17. The process of claim 1, wherein the catalyst is a single entity catalyst.

18. The process of claim 17, wherein the transition metal catalyst comprises a donor atom that cannot be protonated more than 90%, at the pH value of the reaction mixture.

19. The process of claim 18, wherein ligand comprises a sulfur atom.

20. The process of claim 19, wherein the catalyst comprises an additional heterodonor ligand.

21. The process of claim 20, wherein the ligand comprises a charged species.

22. The process of claim 21, wherein the charged species is a phenoxide or a carboxylate.

23. The process of claim 17, wherein the catalytic process is conducted in a polar media.

24. The process of claim 23, wherein the polar media comprises at least one of water and an alcohol.

25. The process of claim 24, wherein the alcohol is at least one of methanol, ethanol, and isopropanol.

26. The process of claim 17, wherein the catalytic reaction is an atom transfer radical polymerization process.

27. The process of claim 26, wherein the atom transfer radical polymerization is conducted in a polar medium.

28. The process of claim 27, wherein the polar medium comprises at least one of water, alcohols, and methanol.

29. The process of claim 17, wherein the catalyst has sufficient stability towards ionic species and conditional radically transferable atom phylicity, to act as a catalyst in the reaction media.

30. A catalytic polymerization process, comprising:
reacting free radically (co)polymerizable acidic monomers utilizing a transition metal complex as a catalyst, wherein the catalytic polymerization process is conducted in a polar media, wherein the transition metal complex has sufficient solubility a redox potential of less than 500 mV, acidity constants of the protonated ligand greater than $10^{-4}$, conditional disproportionation constant less than 1000, and conditional metal-radically transferable atom or group phylicity of greater than 10, and wherein the polymerization has a conversion of acidic monomers of at least 13%.

31. The process of claim 30, wherein the transition metal complex comprises a suitable heterodonor ligand.

32. The process of claim 31, wherein the heterodonor ligand is a bidentate or a multidentate ligand.

33. The process of claim 32, wherein the heterodonor ligand comprises at least two donor atoms each independently selected from the group consisting of oxygen, sulfur, selenium, tellurium, nitrogen, phosphorus, arsenic, antimony, and bismuth.

34. The process of claim 31, wherein the heterodonor ligand comprises a donor atom that cannot be protonated more than 90% at the pH value of the reaction mixture.

35. The process of claim 34, wherein ligand comprises a sulfur atom.

36. The process of claim 35, wherein the heterodonor ligand comprises a sulfur atom and at least one oxygen atom.

37. The process of claim 31, wherein the ligand comprises a charged species.

38. The process of claim 37, wherein the charged species is a phenoxide or a carboxylate.

39. The process of claim 30, wherein the polar media comprises at least one of water and an alcohol.

40. The process of claim 39, wherein the alcohol is at least one of methanol, ethanol, and propanol.

41. The process of claim 30, wherein the catalytic reaction is an atom transfer radical polymerization process.

42. The process of claim 30, wherein the catalyst has sufficient stability towards ionic species, to act as a catalyst in the reaction media.

* * * * *

UNITED STATES PATENT AND TRADEMARK OFFICE
CERTIFICATE OF CORRECTION

PATENT NO.       : 7,332,550 B2
APPLICATION NO.  : 10/684137
DATED            : February 19, 2008
INVENTOR(S)      : Matyjaszewski et al.

It is certified that error appears in the above-identified patent and that said Letters Patent is hereby corrected as shown below:

On the Title Page, Item (56)
References Cited, U.S. Patent Documents, delete "Semiuk" and substitute therefor --Serniuk--.

On the Title Page, Item (56)
Other Publications, page 2, line 31, delete "Methly" and substitute therefor --Methyl--.

Column 5, line 24, delete "comprises" and substitute therefor --comprise--.

Column 5, line 45, delete "illustrates" and substitute therefor --illustrate--.

Column 5, line 56, delete "curve" and substitute therefor --curves--.

Column 5, line 58, delete "illustrates" and substitute therefor --illustrate--.

Column 5, line 67, delete "wavelength" and substitute therefor --wavelengths--.

Column 6, line 16, delete "illustrates" and substitute therefor --illustrate--.

Column 6, line 29, delete "illustrates" and substitute therefor --illustrate--.

Column 7, line 50, delete "this".

Column 11, line 49, delete "HL," and substitute therefor --$HL_r$--.

Column 13, line 26, delete "102" and substitute therefor --$10^2$--.

Column 13, line 35, delete "London1971" and substitute therefor --London, 1971--.

Column 16, line 65, delete "(1987)" and substitute therefor --(1987).--.

Column 19, line 52, delete "R*" and substitute therefor --$R^{\cdot}$--.

UNITED STATES PATENT AND TRADEMARK OFFICE
CERTIFICATE OF CORRECTION

PATENT NO. : 7,332,550 B2
APPLICATION NO. : 10/684137
DATED : February 19, 2008
INVENTOR(S) : Matyjaszewski et al.

It is certified that error appears in the above-identified patent and that said Letters Patent is hereby corrected as shown below:

Column 24, line 51, delete "1997])" and substitute therefor --1997]).--.

Signed and Sealed this

Twenty-third Day of December, 2008

JON W. DUDAS
*Director of the United States Patent and Trademark Office*